US012187321B2

(12) United States Patent
Wongpiromsarn

(10) Patent No.: US 12,187,321 B2
(45) Date of Patent: Jan. 7, 2025

(54) AUTONOMOUS VEHICLE OPERATION USING LINEAR TEMPORAL LOGIC

(71) Applicant: MOTIONAL AD LLC, Boston, MA (US)

(72) Inventor: Tichakorn Wongpiromsarn, Singapore (SG)

(73) Assignee: Motional AD LLC, Boston, MA (US)

( * ) Notice: Subject to any disclaimer, the term of this patent is extended or adjusted under 35 U.S.C. 154(b) by 202 days.

(21) Appl. No.: 18/075,068

(22) Filed: Dec. 5, 2022

(65) Prior Publication Data

US 2023/0095915 A1 Mar. 30, 2023

Related U.S. Application Data

(63) Continuation of application No. 16/892,888, filed on Jun. 4, 2020, now Pat. No. 11,577,754.

(Continued)

(51) Int. Cl.
*B60W 60/00* (2020.01)
*G01C 21/34* (2006.01)
(Continued)

(52) U.S. Cl.
CPC ..... *B60W 60/0025* (2020.02); *G01C 21/3407* (2013.01); *G08G 1/166* (2013.01); *G08G 1/20* (2013.01); *B60W 2552/00* (2020.02)

(58) Field of Classification Search
CPC ......... B60W 60/0025; B60W 2552/00; B60W 30/0953; B60W 30/0956;
(Continued)

(56) References Cited

U.S. PATENT DOCUMENTS

| 10,671,076 B1 | 6/2020 | Kobilarov et al. |
| 11,577,754 B2 | 2/2023 | Wongpiromsarn |

(Continued)

FOREIGN PATENT DOCUMENTS

| CN | 107567405 | 1/2018 |
| CN | 109521761 | 3/2019 |

(Continued)

OTHER PUBLICATIONS

[No Author Listed], "SAE International: Surface Vehicle Recommended Practice," J3016, Sep. 30, 2016, 30 pages.

(Continued)

*Primary Examiner* — James J Lee
*Assistant Examiner* — Alexander George Matta
(74) *Attorney, Agent, or Firm* — Fish & Richardson P.C.

(57) ABSTRACT

Techniques are provided for autonomous vehicle operation using linear temporal logic. The techniques include using one or more processors of a vehicle to store a linear temporal logic expression defining an operating constraint for operating the vehicle. The vehicle is located at a first spatiotemporal location. The one or more processors are used to receive a second spatiotemporal location for the vehicle. The one or more processors are used to identify a motion segment for operating the vehicle from the first spatiotemporal location to the second spatiotemporal location. The one or more processors are used to determine a value of the linear temporal logic expression based on the motion segment. The one or more processors are used to generate an operational metric for operating the vehicle in accordance with the motion segment based on the determined value of the linear temporal logic expression.

18 Claims, 20 Drawing Sheets

Related U.S. Application Data

(60) Provisional application No. 62/856,875, filed on Jun. 4, 2019.

(51) Int. Cl.
  *G08G 1/00* (2006.01)
  *G08G 1/16* (2006.01)

(58) Field of Classification Search
  CPC ....... B60W 60/00274; B60W 2552/53; B60W 2554/80; B60W 2555/60; B60W 2556/45; B60W 30/18159; B60W 30/18163; B60W 60/0013; B60W 60/0015; B60W 60/0011; B60W 2050/0005; G01C 21/3407; G08G 1/166; G08G 1/20; G05D 1/0055; G05D 1/0088; B60Y 2300/0954; B60Y 2300/18166
  See application file for complete search history.

(56) References Cited

U.S. PATENT DOCUMENTS

| | | | |
|---|---|---|---|
| 2018/0129214 | A1 | 5/2018 | During et al. |
| 2018/0251126 | A1 | 9/2018 | Linscott et al. |
| 2019/0101919 | A1* | 4/2019 | Kobilarov .............. G05D 1/617 |
| 2020/0285244 | A1* | 9/2020 | Gier .................... G05D 1/0246 |
| 2020/0346643 | A1 | 11/2020 | Woon et al. |
| 2020/0385024 | A1 | 12/2020 | Wongpiromsarn |
| 2021/0046924 | A1 | 2/2021 | Caldwell et al. |

FOREIGN PATENT DOCUMENTS

| | | |
|---|---|---|
| DE | 102015208790 | 11/2017 |
| DE | 102017120366 | 3/2019 |
| EP | 3454269 | 3/2019 |
| JP | 2017016645 | 1/2017 |
| JP | 6235748 | 11/2017 |
| JP | 2019513612 | 5/2019 |
| KR | 101740529 | 5/2017 |
| KR | 1020170077332 | 7/2017 |
| WO | WO 2017139613 | 8/2017 |

OTHER PUBLICATIONS

Artale, "Formal Methods, Lecture III: Linear Temporal Logic, " Faculty of Computer Science—University of Bolzano, Second Semester 2011/2011, 44 pages.

Castro et al., "Incremental Sampling-based Algorithm for Minimum-violation Motion Planning," IEEE Conference on Decision and Control, Mar. 10, 2014, 8 pages.

Chaudhari et al., "Incremental Minimum-Violation Control Synthesis for Robots Interacting with External Agents," American Control Conference, Jun. 4, 2014, pp. 1761-1786.

Kress-Gazit et al., "Correct, Reactive, High-Level Robot Control," IEEE Robotics & Automation Magazine, Sep. 2011, 18(3):65-74.

Murray et al., "Linear Temporal Logic," Lecture 3, Principles of Model Checking, Chapter 5, Apr. 24, 2012, 21 pages.

Notice of Allowance of Patent in Korean Appln. No. 10-2021-7000256, dated Dec. 14, 2022, 8 pages (with English translation).

PCT International Preliminary Report on Patentability in International Appln. No. PCT/IB2020/055287, dated Dec. 16, 2021, 8 pages.

PCT International Search Report and Written Opinion in International Appln. No. PCT/IB2020/055287, dated Aug. 14, 2020, 11 pages.

\* cited by examiner

1800

Receive, using one or more processors of a vehicle, a plurality of motion segments, wherein each motion segment of the plurality of motion segments connects a first spatiotemporal location to a second spatiotemporal location
1804

Generate, using the one or more processors, a Kripke structure comprising a first vertex corresponding to the first spatiotemporal location, a second vertex corresponding to the second spatiotemporal location, and a plurality of edges, wherein each edge of the plurality of edges corresponds to a respective motion segment of the plurality of motion segments
1808

Receive, using the one or more processors, a linear temporal logic expression defining an operating constraint for operating the vehicle
1812

For each edge of the plurality of edges within the Kripke structure: responsive to a logical value of the linear temporal logic expression determined at either the first vertex or the second vertex being false, assign an operational metric to a motion segment corresponding to the edge
1816

Select, using the one or more processors, a motion segment associated with a lowest operational metric to operate the vehicle
1820

Store, using one or more processors of a vehicle, a Kripke structure representing a motion segment for operating the vehicle, wherein the motion segment comprises a plurality of spatiotemporal locations
1904

For each spatiotemporal location of the plurality of spatiotemporal locations: evaluate, using the one or more processors, a linear temporal logic expression based on the Kripke structure, wherein the linear temporal logic expression defines an operating constraint for operating the vehicle in accordance with the motion segment
1908

Responsive to a logical value of the linear temporal logic expression changing at the spatiotemporal location, insert, using the one or more processors, a location marker within the Kripke structure at the spatiotemporal location to divide the motion segment into two different motion segments
1912

Assign, using the one or more processors, an operational metric to each motion segment of the two different motion segments based on the location marker
1916

Determine, using the one or more processors, a trajectory for operating the vehicle based on the operational metric
1920

```
Store, using one or more processors of a vehicle, a linear temporal logic
expression corresponding to a collision of the vehicle with an object
2004
```

```
Receive, using the one or more processors, a first motion segment for operating
the vehicle
2008
```

```
Determine, using the one or more processors, a first logical value of the linear
temporal logic expression based on the first motion segment
2012
```

Responsive to the determined first logical value indicating that a first probability of collision of the vehicle with the object is greater than a threshold value, operate, using a control module of the vehicle, the vehicle in accordance with a second motion segment that is different from the first motion segment, wherein a second logical value of the linear temporal logic expression determined based on the second motion segment indicates that a second probability of collision of the vehicle with the object is less than the threshold value
2016

FIG. 20

AUTONOMOUS VEHICLE OPERATION USING LINEAR TEMPORAL LOGIC

CROSS-REFERENCE TO RELATED APPLICATION

This application is a continuation of U.S. application Ser. No. 16/892,888, filed Jun. 4, 2020 (now allowed), which claims the benefit of U.S. Provisional Application 62/856,875, filed on Jun. 4, 2019, which is incorporated herein by reference in its entirety.

FIELD OF THE INVENTION

This description relates generally to path planning for operation of vehicles.

BACKGROUND

Operation of a vehicle from an initial location to a final destination often requires a user or the vehicle's decision-making system to select a route through a road network from the initial location to a final destination. Selecting a complex route can require many decisions, making traditional algorithms for route selection impractical.

SUMMARY

Techniques are provided for autonomous vehicle (AV) operation using linear temporal logic. The techniques include using one or more processors of a vehicle to store a linear temporal logic expression defining an operating constraint for operating the vehicle. The vehicle is located at a first spatiotemporal location. The one or more processors receive a second spatiotemporal location for the vehicle. The one or more processors are used to identify a motion segment for operating the vehicle from the first spatiotemporal location to the second spatiotemporal location. The one or more processors determine a value of the linear temporal logic expression based on the motion segment. The one or more processors generate an operational metric for operating the vehicle in accordance with the motion segment based on the determined value of the linear temporal logic expression.

In an embodiment, one or more processors of a vehicle receive one or more operating constraints for operating the vehicle. Each operating constraint of the one or more operating constraints is defined by a respective linear temporal logic expression. The one or more processors determine one or more motion segments for operating the vehicle. Each motion segment of the one or more motion segments connects two different spatiotemporal locations. The one or more processors determine values of the one or more linear temporal logic expressions for a sequence of states of the vehicle based on a temporal modal operator. The one or more processors assign operational metrics to the one or more motion segments based on the values of the one or more linear temporal logic expressions. The one or more processors select a motion segment of the one or more motion segments. The selected motion segment has an assigned operational metric below a threshold value. A control module of the vehicle operates the vehicle in accordance with the selected motion segment.

In an embodiment, one or more processors of a vehicle receive multiple motion segments. Each motion segment of the multiple motion segments connects a first spatiotemporal location to a second spatiotemporal location. The one or more processors generate a Kripke structure including a first vertex corresponding to the first spatiotemporal location. A second vertex corresponds to the second spatiotemporal location. The Kripke structure includes multiple edges. Each edge of the multiple edges corresponds to a respective motion segment of the multiple motion segments. The one or more processors receive a linear temporal logic expression defining an operating constraint for operating the vehicle. For each edge of the multiple edges within the Kripke structure: responsive to a value of the linear temporal logic expression determined at either the first vertex or the second vertex being false, the one or more processors assign an operational metric to a motion segment corresponding to the edge. The one or more processors select a motion segment associated with a lowest operational metric to operate the vehicle.

In an embodiment, one or more processors of a vehicle store a Kripke structure representing a motion segment for operating the vehicle. The motion segment includes multiple spatiotemporal locations. For each spatiotemporal location of the multiple spatiotemporal locations: the one or more processors evaluate a linear temporal logic expression based on the Kripke structure. The linear temporal logic expression defines an operating constraint for operating the vehicle in accordance with the motion segment. Responsive to a value of the linear temporal logic expression changing at the spatiotemporal location, the one or more processors insert a location marker within the Kripke structure at the spatiotemporal location to divide the motion segment into two different motion segments. The one or more processors assign an operational metric to each motion segment of the two different motion segments based on the location marker. The one or more processors determine a trajectory for operating the vehicle based on the operational metric.

In an embodiment, one or more processors of a vehicle store a linear temporal logic expression corresponding to a collision of the vehicle with an object. The one or more processors receive a first motion segment for operating the vehicle. The one or more processors determine a first value of the linear temporal logic expression based on the first motion segment. Responsive to the determined first value indicating that a first probability of collision of the vehicle with the object is greater than a threshold value, a control module of the vehicle operates the vehicle in accordance with a second motion segment that is different from the first motion segment. A second value of the linear temporal logic expression determined based on the second motion segment indicates that a second probability of collision of the vehicle with the object is less than the threshold value.

These and other aspects, features, and implementations can be expressed as methods, apparatus, systems, components, program products, means or steps for performing a function, and in other ways.

These and other aspects, features, and implementations will become apparent from the following descriptions, including the claims.

Among others, the benefits and advantages of the embodiments disclosed herein include the navigation of an AV along a reduced-cost trajectory resulting in increased passenger and pedestrian safety, lower wear and tear on the AV, reduced travel time, and a reduced travel distance. The generation of preferred trajectories based on traffic rules increases safety for the AV, other vehicles on the road network, and pedestrians. When the AV determines that a potential trajectory would violate a higher-ranked operational constraint, evaluation of the potential trajectory is terminated to reduce computation time. The embodiments disclosed herein avoid the high computation cost of generating a weighted product automaton from traffic rules. Hence, the generation of reduced-cost trajectories is performed in real-time for moving vehicles.

BRIEF DESCRIPTION OF THE DRAWINGS

FIGS. 16-20 show processes for autonomous vehicle operation using linear temporal logic, in accordance with one or more embodiments.

DETAILED DESCRIPTION

Figure 1:
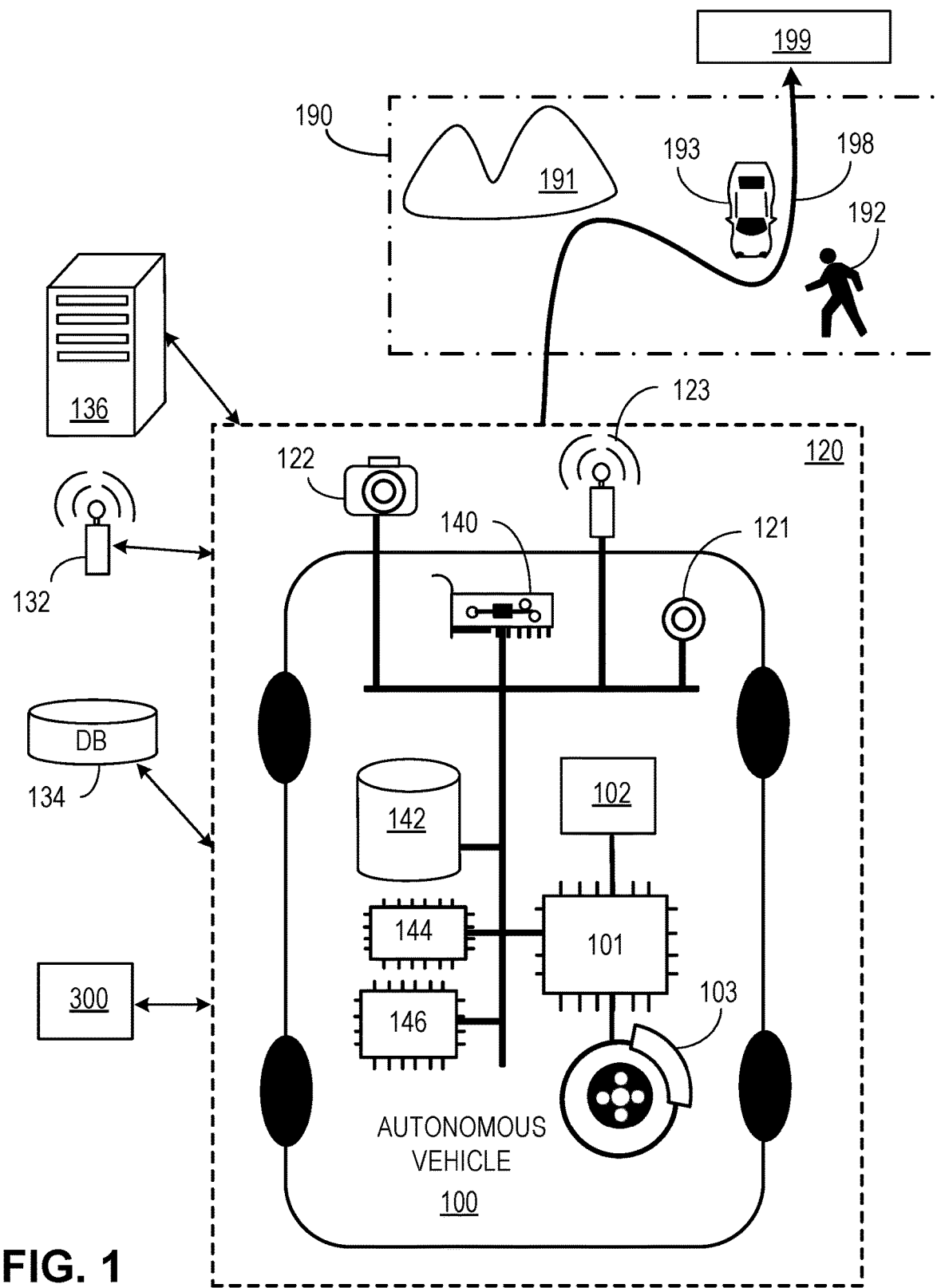
FIG. 1 shows an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements In an embodiment.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Operating Environment for AV Operation Using Linear Temporal Logic
8. Examples of AV Operation Using Linear Temporal Logic
9. Processes for AV Operation Using Linear Temporal Logic

General Overview

An autonomous vehicle (AV) located at an initial spatiotemporal location stores a linear temporal logic expression defining an operating constraint for operating the AV. A linear temporal logic expression is a modal temporal logic expression having modalities referring to time. The operating constraint is, e.g., a traffic rule or a rule meant to increase a level of passenger comfort of a passenger riding in the AV. The AV receives a destination spatiotemporal location for the AV to travel to. For example, the AV may receive instructions specifying the destination spatiotemporal location from a passenger riding in the AV or from a remote server. The AV uses the one or more processors to identify a motion segment for operating the AV from the initial spatiotemporal location to the destination spatiotemporal location. A motion segment is a portion of a travel lane. In addition, the motion segment specifies, e.g., a speed of the AV when traveling on the travel lane. The AV determines a value of the linear temporal logic expression based on the motion segment. For example, the AV evaluates the linear temporal logic expression to determine whether the operating constraint will be violated. The AV generates an operational metric for operating the AV in accordance with the motion segment based on the determined value of the linear temporal logic expression. The operational metric is a cost of violating the operating constraint. Thus the AV generates a reduced cost trajectory from the initial spatiotemporal location to the destination spatiotemporal location.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, In an embodiment, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In an embodiment, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
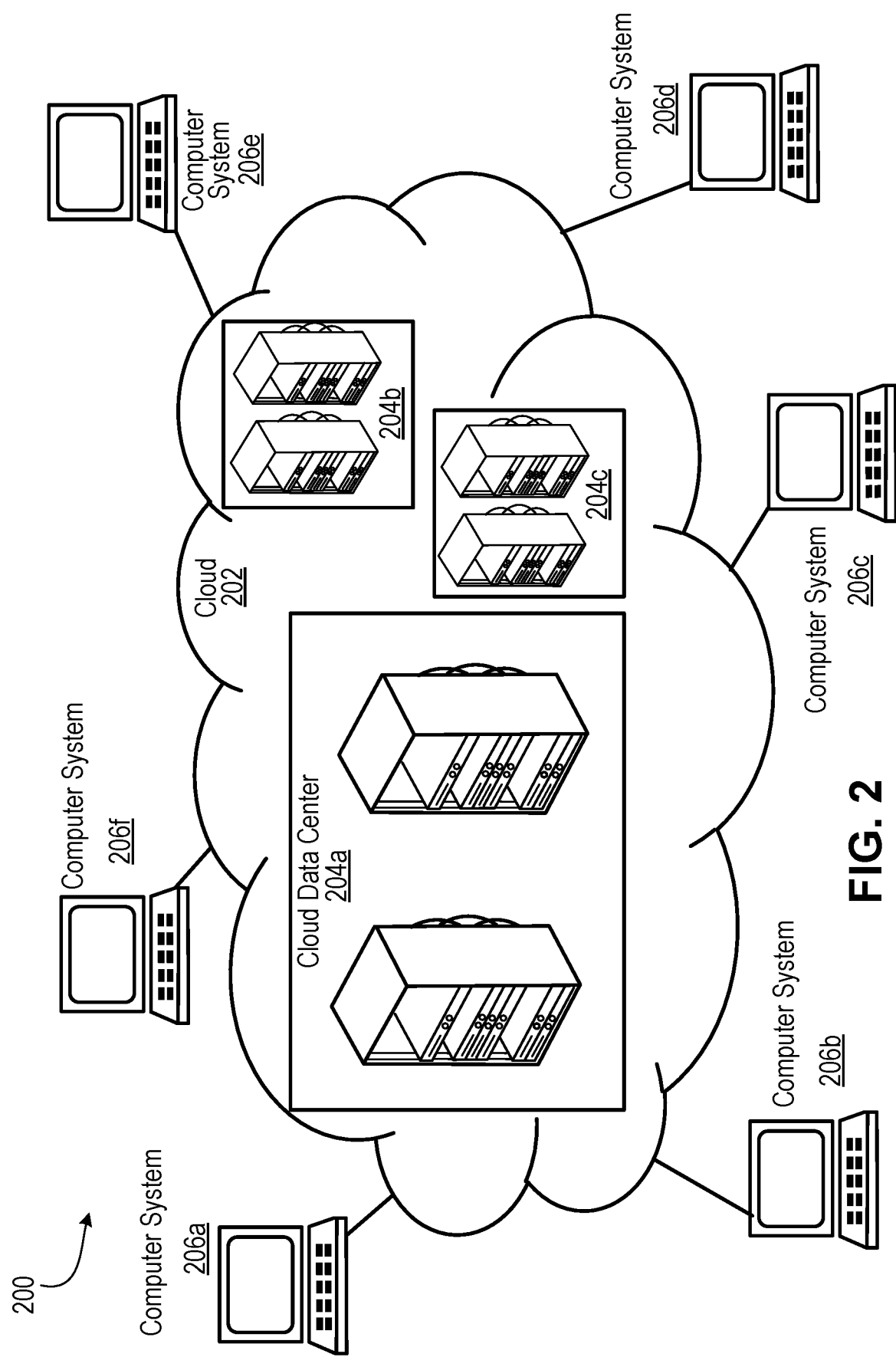
FIG. 2 shows an example "cloud" computing environment, in accordance with one or more embodiments.

FIG. 2 shows an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In an embodiment, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
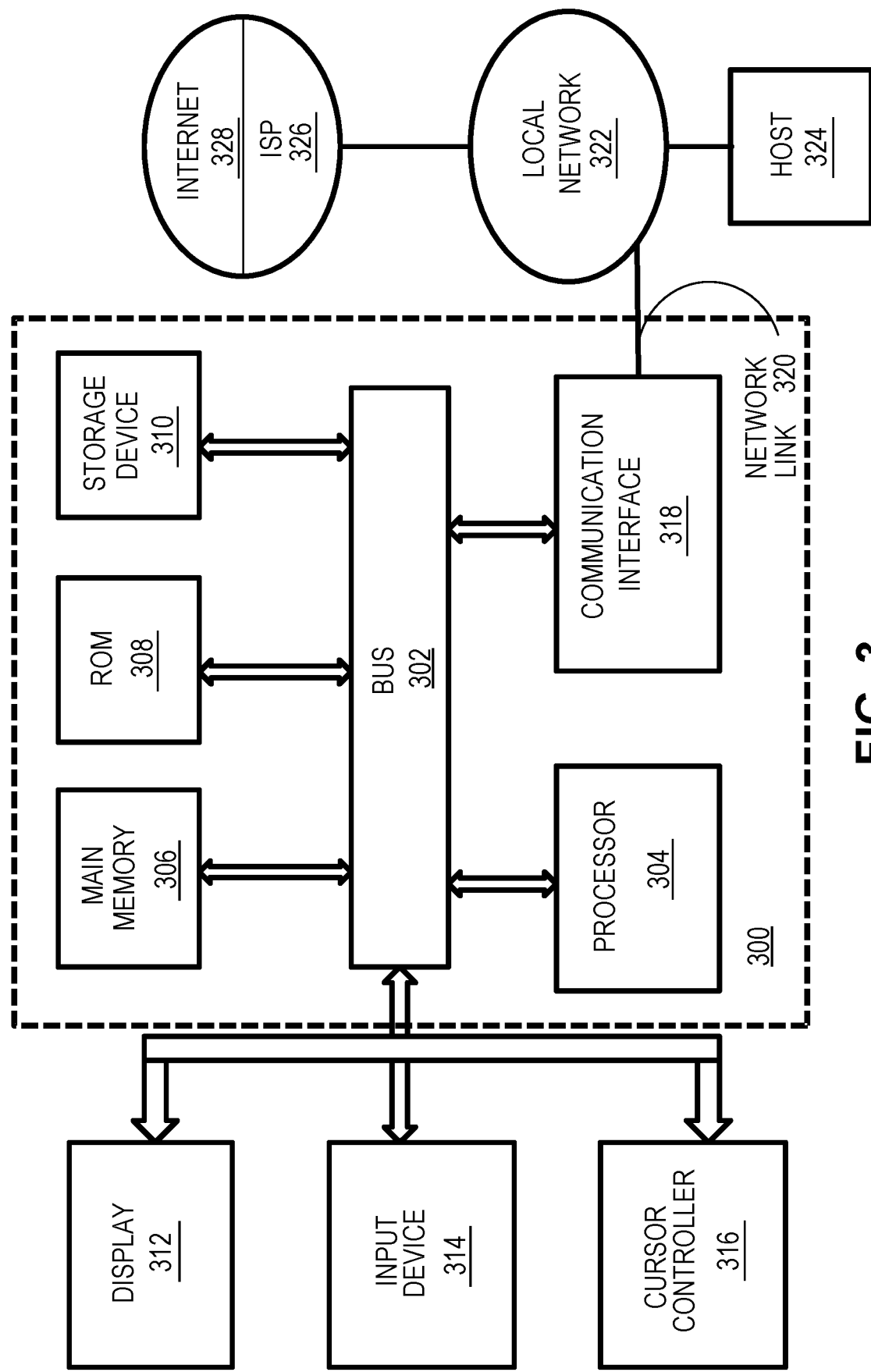
FIG. 3 shows a computer system, in accordance with one or more embodiments.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
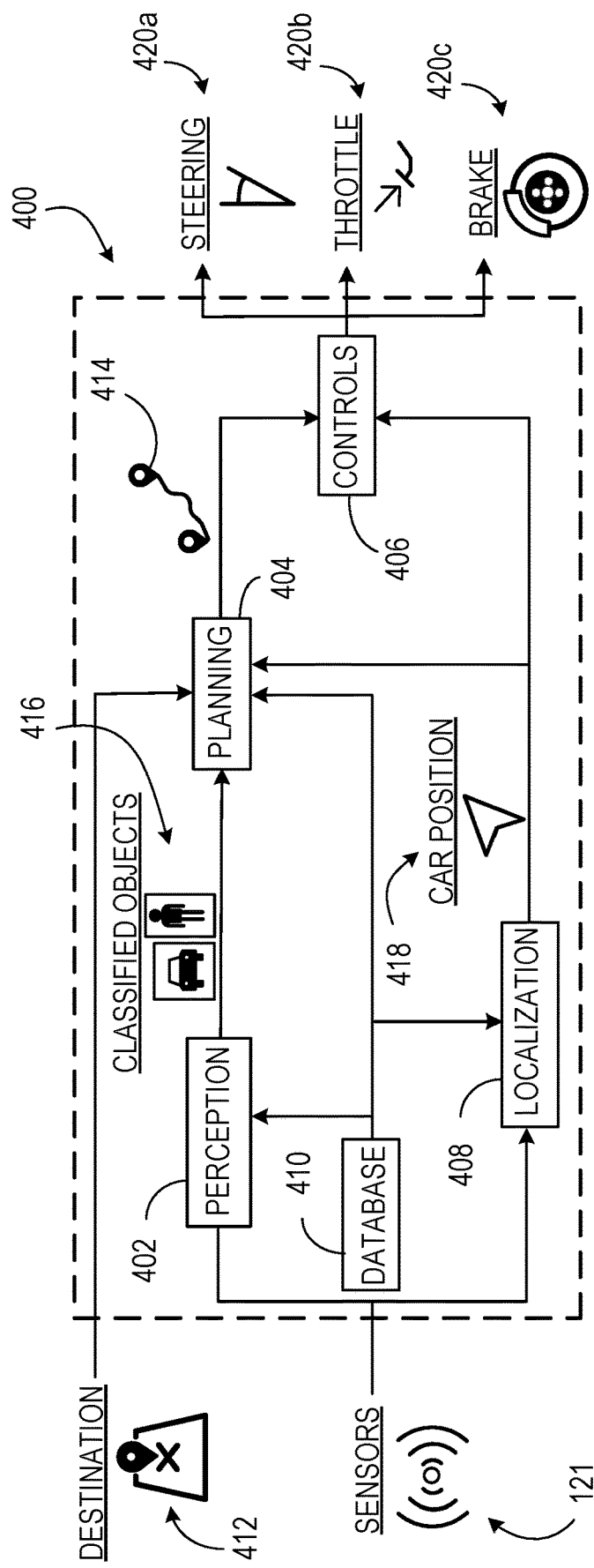
FIG. 4 shows an example architecture for an AV, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In an embodiment, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Operation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420*a-c* (e.g., steering, throttling, braking, ignition) of the AV in a manner that will cause the AV 100 to travel the trajectory 414 to the destination 412. For example, if the trajectory 414 includes a left turn, the control module 406 will operate the control functions 420*a-c* in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
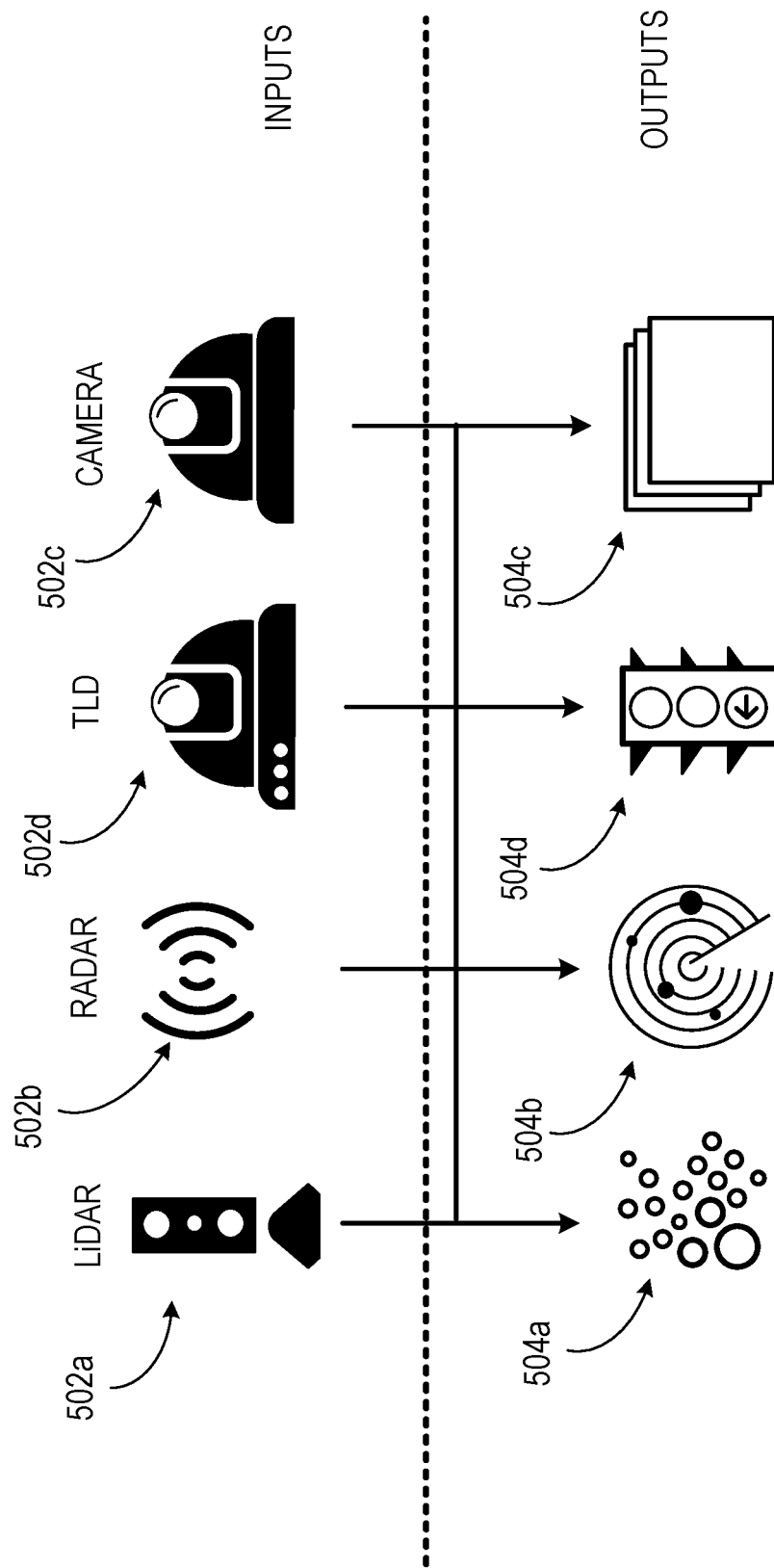
FIG. 5 shows an example of inputs and outputs that may be used by a perception module, in accordance with one or more embodiments.

FIG. 5 shows an example of inputs 502*a-d* (e.g., sensors 121 shown in FIG. 1) and outputs 504*a-d* (e.g., sensor data) that is used by the perception module 402 (FIG. 4). One input 502*a* is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504*a*. For example, LiDAR data is collections of 3D or 2D points (also known as a point clouds) that are used to construct a representation of the environment 190.

Another input 502*b* is a RADAR system. RADAR is a technology that uses radio waves to obtain data about nearby physical objects. RADARs can obtain data about objects not within the line of sight of a LiDAR system. A RADAR system 502*b* produces RADAR data as output 504*b*. For example, RADAR data are one or more radio frequency electromagnetic signals that are used to construct a representation of the environment 190.

Another input 502*c* is a camera system. A camera system uses one or more cameras (e.g., digital cameras using a light sensor such as a charge-coupled device [CCD]) to obtain information about nearby physical objects. A camera system produces camera data as output 504*c*. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502*d* is a traffic light detection (TLD) system. A TLD system uses one or more cameras to obtain information about traffic lights, street signs, and other physical objects that provide visual operation information. A TLD system produces TLD data as output 504*d*. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual operation information as possible, so that the AV 100 has access to all relevant operation information provided by these objects. For example, the viewing angle of the TLD system may be about 120 degrees or more.

In an embodiment, outputs 504*a-d* are combined using a sensor fusion technique. Thus, either the individual outputs 504*a-d* are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In an embodiment, an early fusion technique is used. An early fusion technique is characterized by combining outputs before one or more data processing steps are applied to the combined output. In an embodiment, a late fusion technique is used. A late fusion technique is characterized by combining outputs after one or more data processing steps are applied to the individual outputs.

Figure 6:
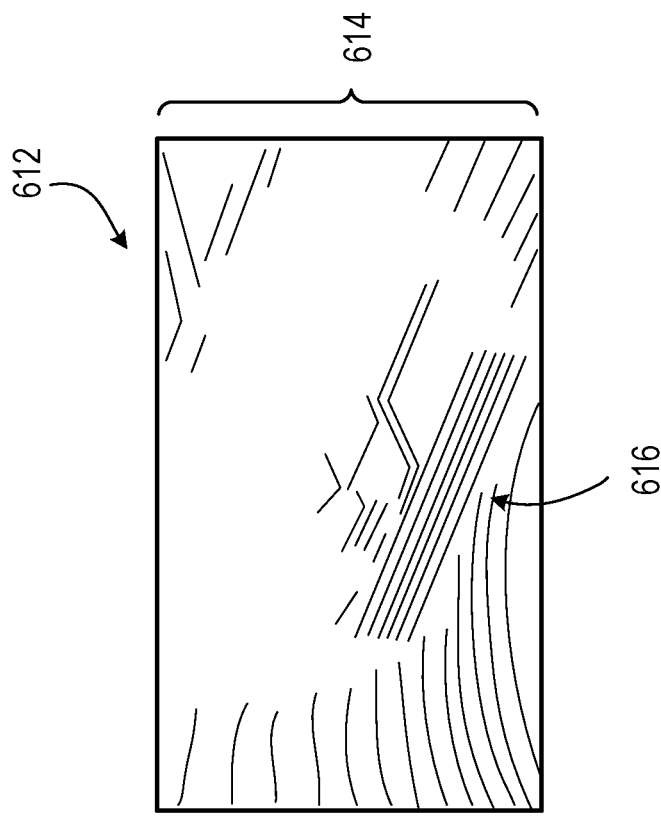
FIG. 6 shows an example of a LiDAR system, in accordance with one or more embodiments.
Figure 6:
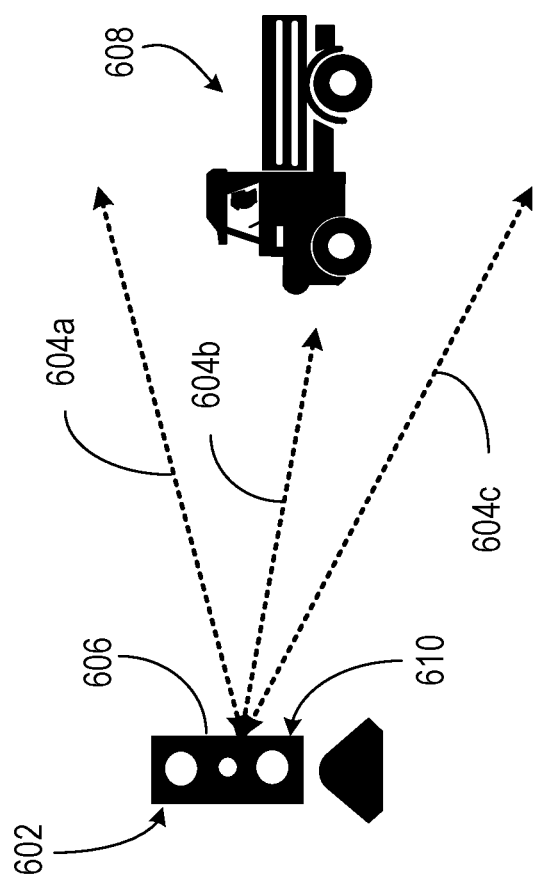

FIG. 6 shows an example of a LiDAR system 602 (e.g., the input 502*a* shown in FIG. 5). The LiDAR system 602 emits light 604*a-c* from a light emitter 606 (e.g., a laser transmitter). Light emitted by a LiDAR system is typically not in the visible spectrum; for example, infrared light is often used. Some of the light 604*b* emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
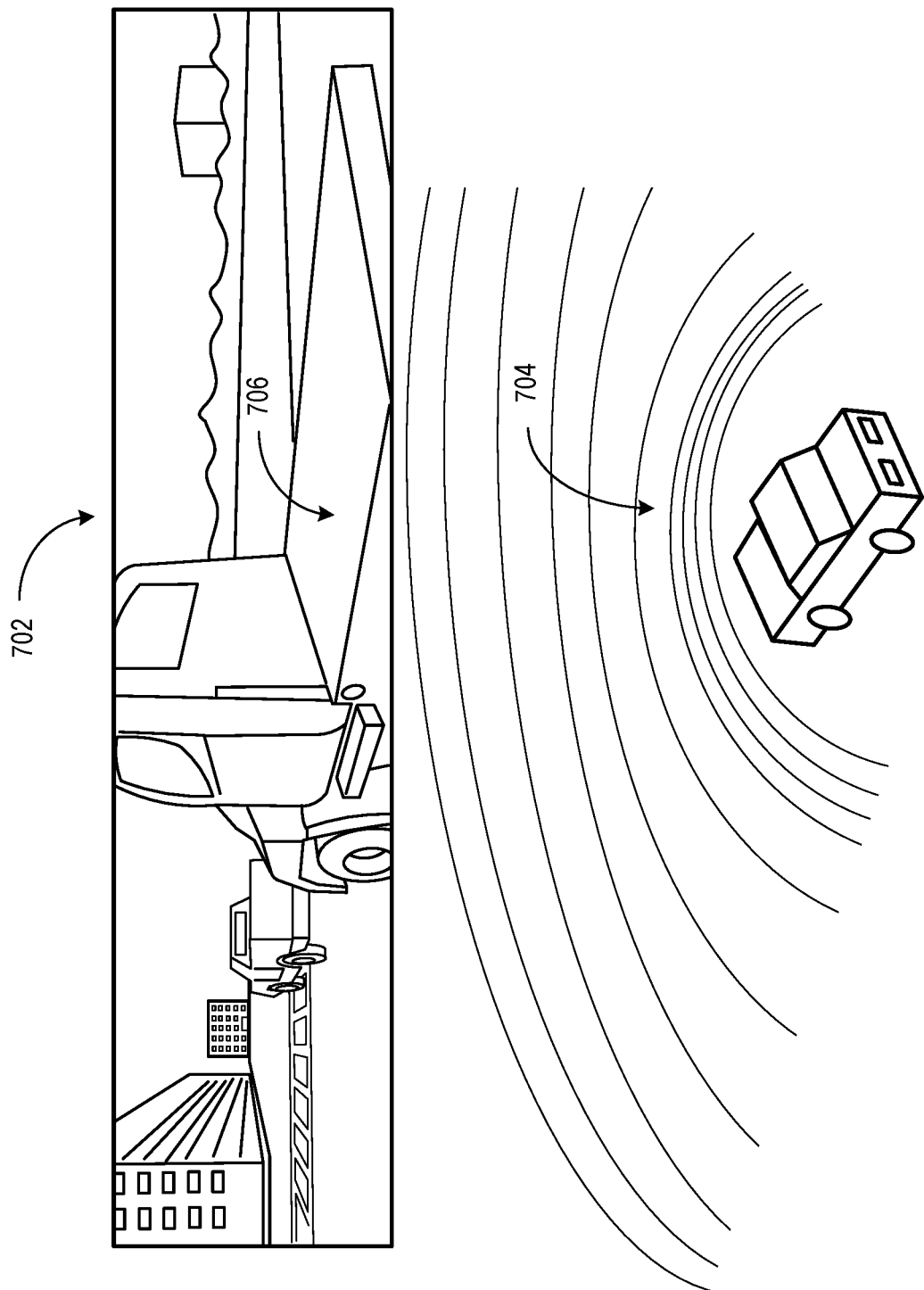
FIG. 7 shows the LiDAR system in operation, in accordance with one or more embodiments.

FIG. 7 shows the LiDAR system 602 in operation. In the scenario shown in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
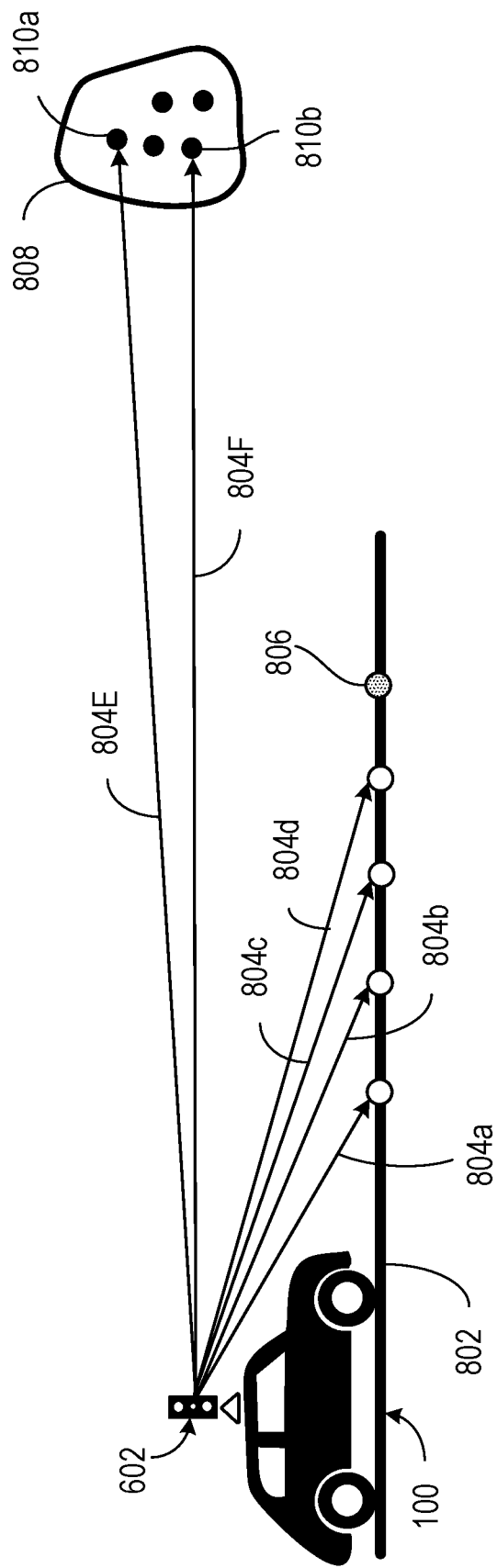
FIG. 8 shows the operation of the LiDAR system in additional detail, in accordance with one or more embodiments.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Path Planning

Figure 9:
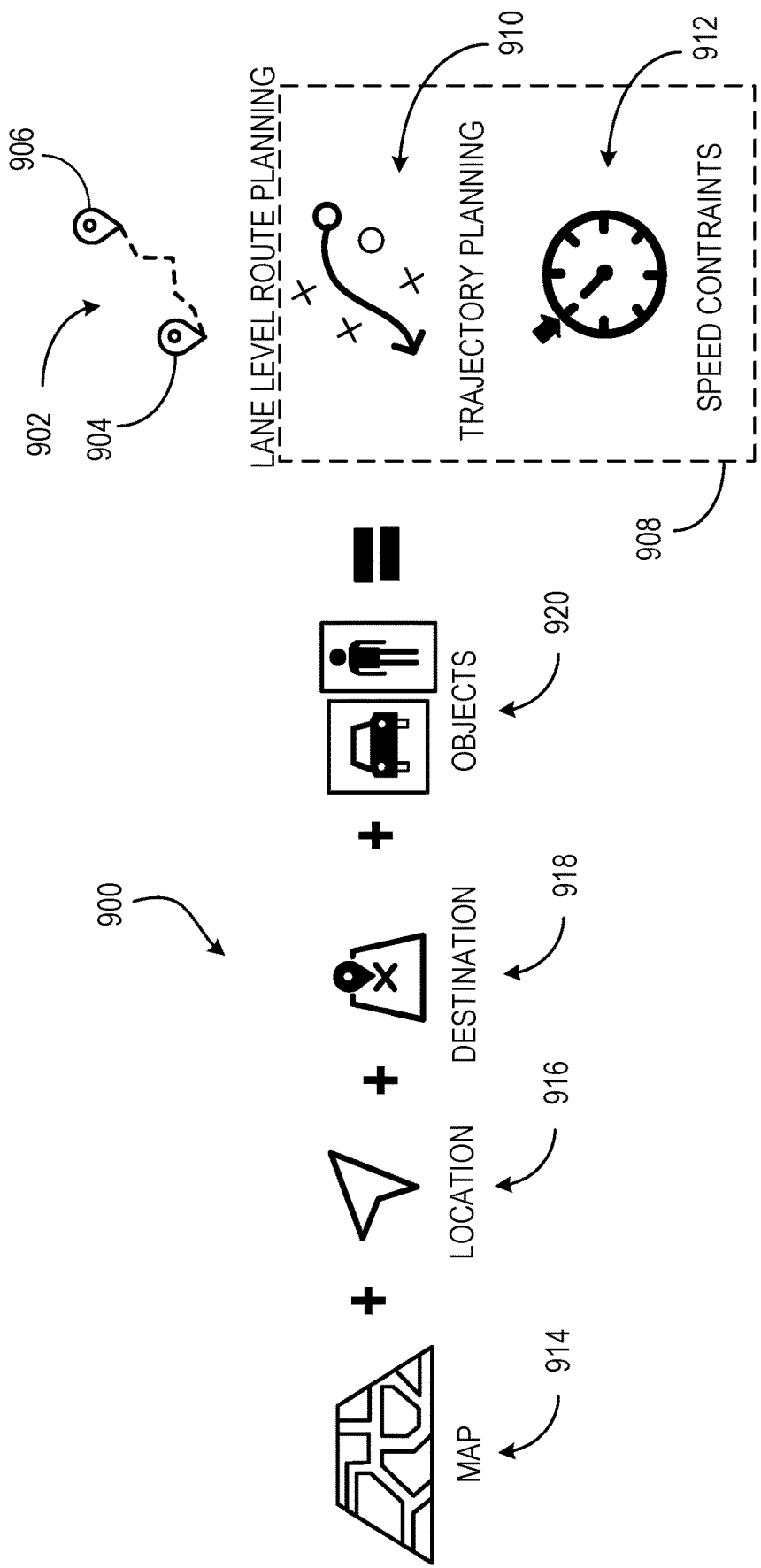
FIG. 9 shows a block diagram of the relationships between inputs and outputs of a planning module, in accordance with one or more embodiments.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4

WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In an embodiment, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
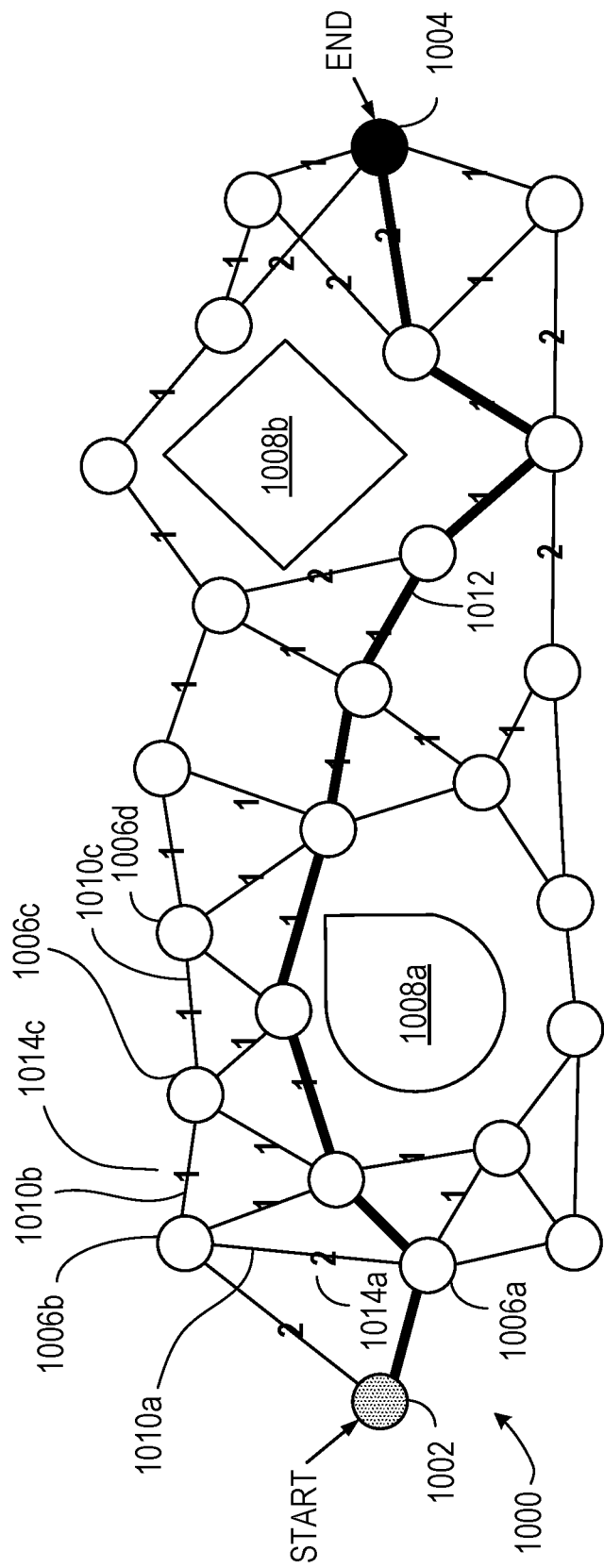
FIG. 10 shows a directed graph used in path planning, in accordance with one or more embodiments.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
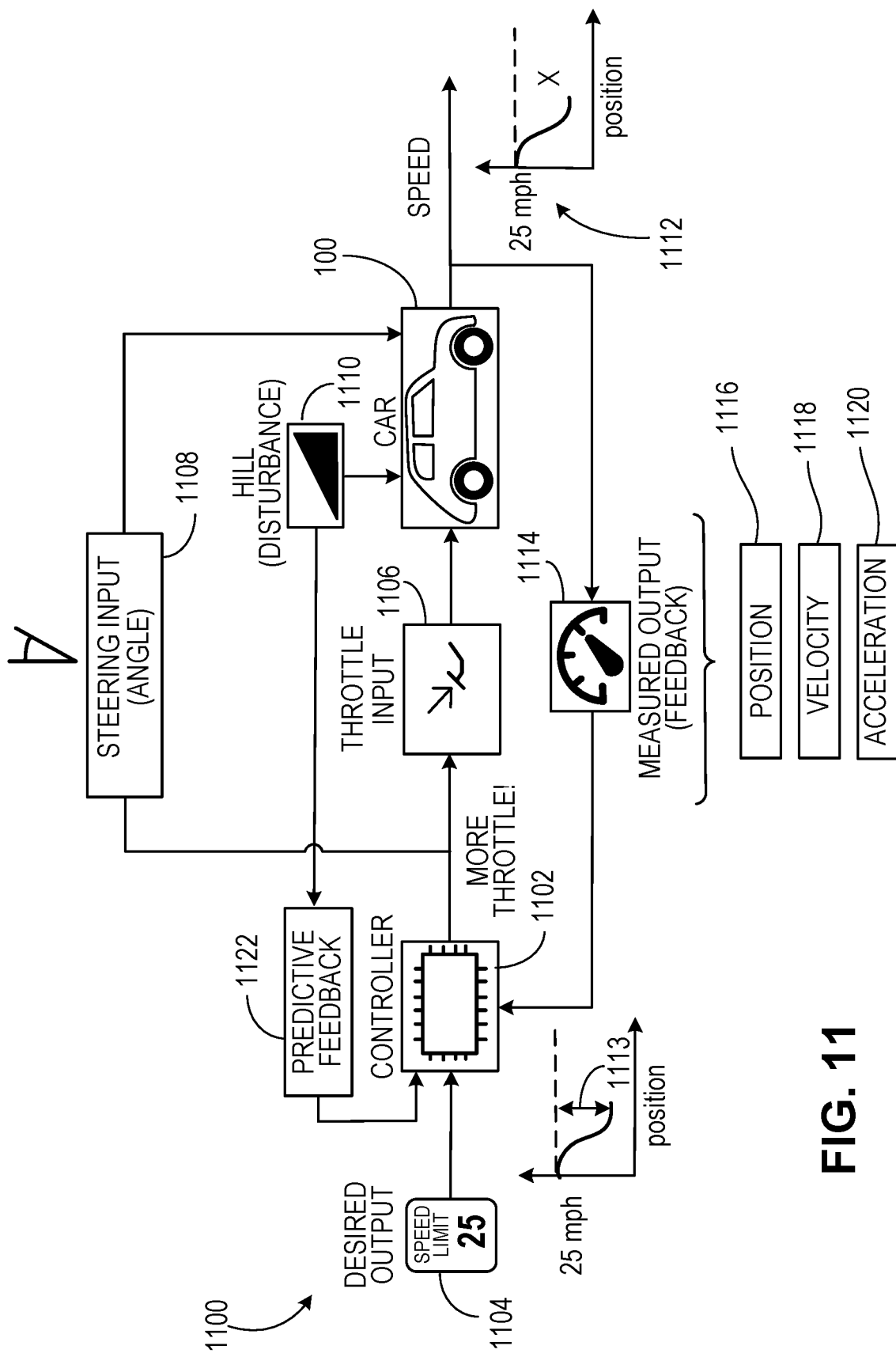
FIG. 11 shows a block diagram of the inputs and outputs of a control module, in accordance with one or more embodiments.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
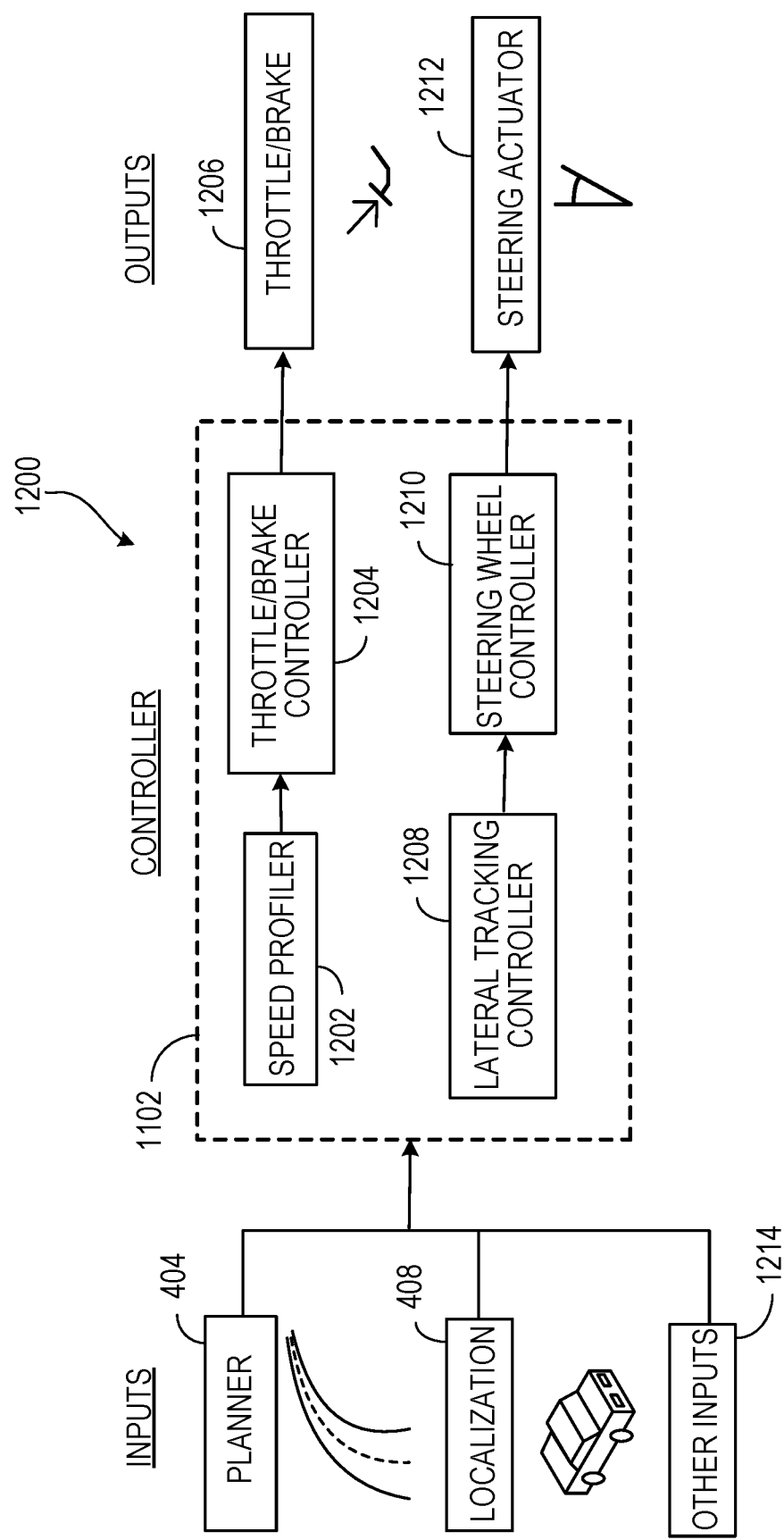
FIG. 12 shows a block diagram of the inputs, outputs, and components of a controller, in accordance with one or more embodiments.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Figure 13:
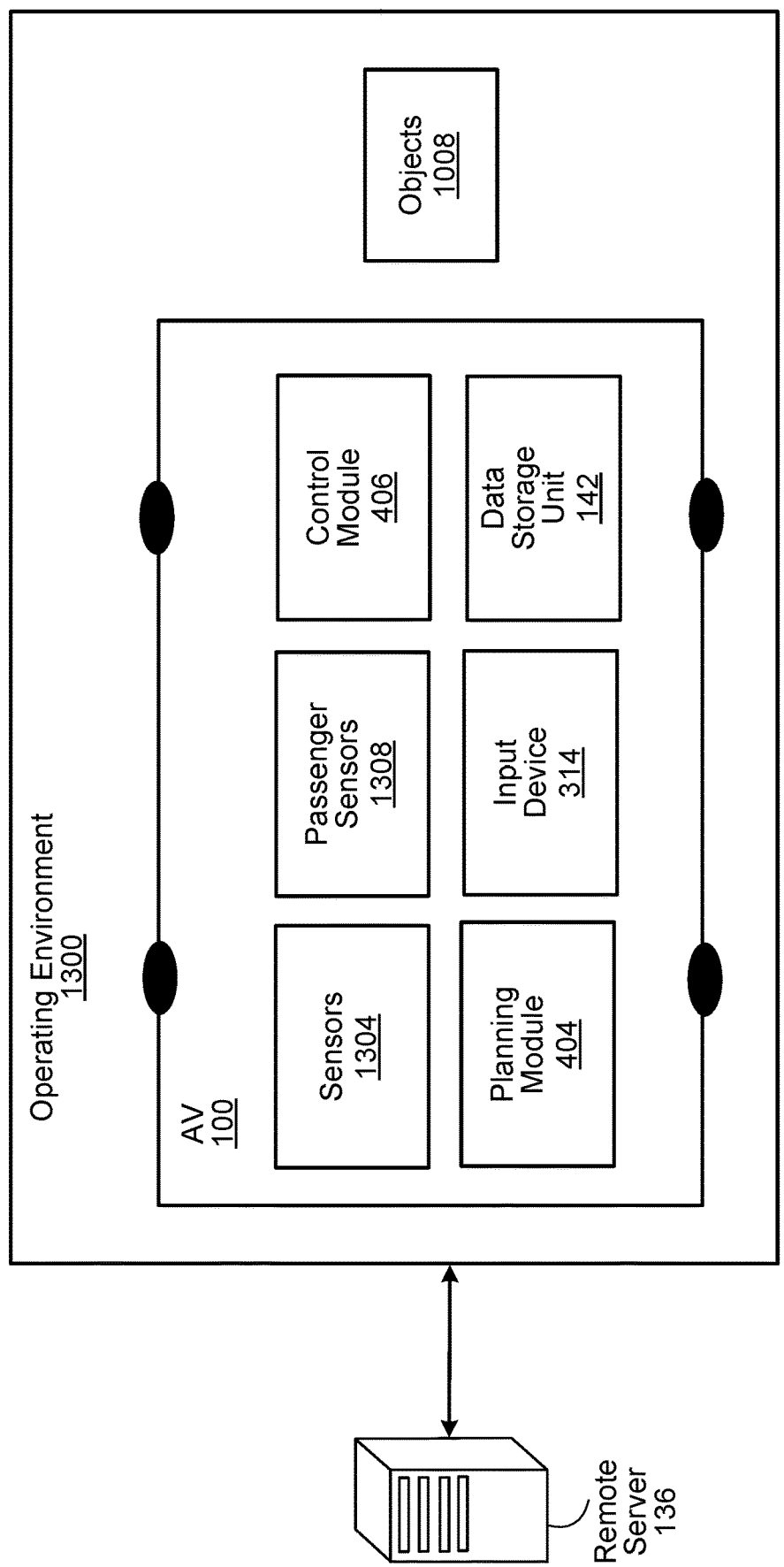
FIG. 13 shows a block diagram of an operating environment for autonomous vehicle operation using linear temporal logic, in accordance with one or more embodiments.

Operating Environment for Autonomous Vehicle Operation Using Linear Temporal Logic FIG. 13 shows a block diagram of an operating environment 1300 for autonomous vehicle (AV) operation using linear temporal logic, in accordance with one or more embodiments. The block diagram of FIG. 13 includes a remote server 136 and the operating environment 1300. In other embodiments, the block diagram of FIG. 13 includes additional or fewer objects than those described herein.

The remote server 136 shown in FIG. 13 is a teleoperation server or a cloud server as illustrated and described above with reference to FIG. 1. The remote server 136 includes one or more processors and data storage. The remote server 136 communicates with entities in the operating environment 1300, for example, the AV 100 over a network. The network represents any combination of one or more local networks, wide area networks, or internetworks coupled using wired or wireless links deployed using terrestrial or satellite connections. Data exchanged over the network is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In an embodiment, the network represents one or more interconnected internetworks, such as the public Internet.

The operating environment 1300 represents a geographical area, such as a state, a town, a neighborhood, or a road network. The operating environment 1300 may be an example of the operating environment 190 illustrated and described above with reference to FIG. 1. The AV 100 and one or more objects 1008 are located within the operating environment 1300. The objects 1008 are physical entities external to the AV 100 as described above with reference to FIG. 1000.

The one or more objects 1008 are external to the AV 100 and may be examples of the objects 416 illustrated and described above with reference to FIGS. 4 and 5. The object 1008 is illustrated and described above with reference to FIG. 1008. In an embodiment, the object 1008 is a static portion or aspect of the AV operating environment 1300, such as a road segment, a traffic signal a building, a parking space located on a road segment, a highway exit or entrance ramp, multiple lanes of a drivable area of the AV operating environment 1300, an elevation of the drivable area, a curb located adjacent to the drivable area, or a median separating two lanes of the drivable area. In an embodiment, the object 1008 is a dynamic object, such as another vehicle 193, a pedestrian 192, a cyclist, or a person riding a small form-factor vehicle such as a skateboard, an e-scooter, a Segway™, a personal light electric vehicle, or a personal mobility device. The AV 100 receives sensor data representing characteristics of the objects 1008 and performs collision prediction and reduces driving aggressiveness if needed. The objects 1008 are described above in more detail with reference to the physical object 608, boundaries 616 of a physical object 608, the physical object 706, the ground 802, and the object 808 in FIGS. 6, 7, and 8.

The AV 100 is a partly autonomous or fully autonomous vehicle that uses one or more sensors 1304 and a planning module 404 to plan a trajectory to navigate around the object 1008. An example of such a trajectory is the trajectory 198 shown in FIG. 1. The AV 100 includes the sensors 1304, one or more passenger sensors 1308, a control module 406, the planning module 404, one or more input devices 314, and a data storage unit 142. The AV 100 is described above in more detail with reference to FIG. 1. In other embodiments, the AV 100 includes additional or fewer components than those described herein. Similarly, the functions are distributed among the components and/or different entities in a different manner than is described here.

The one or more sensors 1304 of the AV 100 include visual sensors that sense a state of the operating environment 1300 such as the presence of the objects 1008. The sensors 1304 are communicatively coupled to the perception module 402 to transmit sensor data. The perception module 402 is described in more detail above with reference to FIG. 4. The sensors 1304 include one or more monocular or stereo video cameras in the visible light, infrared or thermal (or both) spectra, LiDAR, RADAR, ultrasonic sensors, or time-of-flight (TOF) depth sensors. The sensors 1304 can be an example of the sensors 122-123 illustrated and described above with reference to FIG. 1.

In an embodiment, the sensor data includes LiDAR point cloud data or camera images. The LiDAR sensors of the AV 100 are used to illuminate the objects 1008 with pulsed laser light and measure the reflected pulses. Differences in laser return times and wavelengths are then used to generate the sensor data and create a digital 3-D representation of the objects 1008. In an embodiment, the LiDAR point cloud data is stored as a multidimensional occupancy grid. The LiDAR point cloud data is pre-processed at the signal level and then processed at a higher level to extract characteristics of the objects 1008. In an embodiment, a combination two- and three-dimensional grid structure is used and the space in these structures is tessellated into several discrete cells. The structure of the LiDAR point cloud data allows a large amount of raw measurement data to be handled by the AV 100.

The one or more passenger sensors 1308 include specialized sensors to record data such as facial expressions of the passenger, skin conductance, pulse and heart-rate, a temperature of the passenger's body, pupil dilation, and pressure on the AV seat arm rests. Each type of data is recorded using a different sensor or a combination of different sensors, for example, heart rate monitors, a sphygmomanometer, a pupilometer, an Infrared thermometer, or a galvanic skin response sensor. The planning module 404 generates a trajectory for the AV 100 to reduce, for example, an elevated heart rate or skin conductance level as detected by the passenger sensors 1308 that is indicative of passenger discomfort or stress. As would be understood by one of ordinary skill, one or more physical measurements of one or more passengers may be correlated with a level of discomfort or stress and that may be adjusted for by a change in trajectory.

In an embodiment, the planning module 404 generates the trajectory such that a level of passenger comfort measured, using the passenger sensors, is above a threshold value. For example, the threshold value ranges between 75% and 90%. A level of passenger comfort of 0% means that the passenger is extremely uncomfortable. Such a level will not normally ever be experienced. A level of passenger comfort of 100% means that the passenger is very comfortable and further changes in the trajectory will not add to the level of passenger comfort. The planning module 404 selects a lower speed or less-aggressive turns to generate a different trajectory that provides a greater level of passenger comfort. In this manner, the planning module 404 uses motion planning to improve passenger comfort.

The input device 314 is illustrated and described in more detail above with reference to FIG. 3. In an embodiment, the input device 314 includes a smart speaker that receives voice commands from a passenger riding in the AV 100. The smart speaker includes one or more near-field or far-field microphones to receive the commands. The smart speaker also delivers audio messages from the AV 100 or remote server 136 to a passenger. In an embodiment, the smart speaker includes or is connected to a smart assistant of the AV 100 or remote server 136. The smart assistant looks up information, such as weather, route planning, etc., and also delivers alerts to the passenger about impending maneuvers.

The data storage unit 142 is illustrated and described in more detail above with reference to FIG. 1. The data storage unit 142 is used to store data, for example, sensor data from the sensors 1304, passenger sensor data from the passenger sensors 1308, instructions on routing received from the remote server 136, or trajectory data generated by the planning module 404.

The planning module 404 is illustrated and described in more detail above with reference to FIG. 4. In driving mode, the perception module 402 uses data from the sensors 1304, for example, acoustic sensor data, LiDAR data, or stereo camera data, to detect and classify or label static objects and dynamic objects in the operating environment 1300. The classified/labeled objects 1008 and their characteristics, for example, positions, velocities, or headings, are used by the planning module 404 to predict a collision between the AV 100 and an object 1008 within the operating environment 1300 and to generate a safe trajectory through the operating environment 1300.

In an embodiment, the AV 100 is located at an initial spatiotemporal location such as a hotel or a transit center. The AV 100 receives from the remote server 136 or from the data storage unit 142 a linear temporal logic expression defining an operating constraint for operating the AV 100. An operating constraint is a rule that the AV 100 is intended to follow when operating in the operating environment 1300. The operating constraint is a traffic rule or a constraint that increases the level of passenger comfort for a passenger riding in the AV 100. For example, a constraint that increases the level of passenger comfort specifies a maximum limit on acceleration of the AV 100. In an embodiment, the AV 100 receives from the remote server 136 or retrieves from the data storage unit 142 one or more operating constraints for operating the AV 100. Each operating constraint of the one or more operating constraints is defined by a respective linear temporal logic expression.

Linear temporal logic is a modal temporal logic having modalities referring to time. A linear temporal logic expression is a formula expressing whether an operating condition of the AV 100 will eventually be true or whether the operating condition of the AV 100 will be true until another condition is satisfied, etc. A linear temporal logic expression is generated from a finite set of propositional variables AP, the logical operators ¬ and V, and the temporal modal operators NEXT and UNTIL. The use of the NEXT temporal modal operator is described in more detail below.

In an embodiment, the AV 100 receives, from the remote server 136 or from a passenger using the input device 314, a destination spatiotemporal location for the AV 100 to travel to. For example, the destination spatiotemporal location is a residence or office. The planning module 404 identifies a motion segment for operating from the initial spatiotemporal location to the destination spatiotemporal location. A motion segment is a portion of the drivable area of the operating environment 1300. For example, a motion segment includes a lane, a section of a street, or an intersection. A motion segment specifies, e.g., a speed of the AV 100, an acceleration of the AV 100, or a directional orientation of the AV 100 when the AV 100 is operating in accordance with the motion segment. In an embodiment, the planning module 404 uses sensor data received using the sensors 1304 to identify a motion segment based on a path planning graph, e.g., the path planning graph 1000 illustrated and described in more detail above with reference to FIG. 10. In an embodiment, the AV 100 uses the planning module 404 to determine one or more motion segments for operating the AV 100.

The planning module 404 determines a value of a linear temporal logic expression for the AV 100 based on a motion segment. In an embodiment, the value of the linear temporal logic expression is a binary value, e.g., true/false or 0/1. In other embodiments, the value of the linear temporal logic expression represents an operational property or state of the AV 100. For example, the value of the linear temporal logic expression denotes whether the AV 100 is changing lanes, whether a right lane boundary of the AV 100 includes broken yellow lines, or whether the AV 100 is located within an intersection. A linear temporal logic expression includes one or more linear temporal logic propositions. For example, a linear temporal logic expression defines an operating constraint specifying that the AV 100 should not change lanes while operating within an intersection. The linear temporal logic expression is denoted by:
  id: no_lane_change_in_intersection
  requirement:
    !in_intersection||is_baseline
  is_dynamic: 0,
where !in_intersection is a linear temporal logic proposition denoting whether the AV 100 is not located within an intersection and is_baseline is a propositional variable denoting the spatiotemporal location of the AV 100. Similarly, a linear temporal logic proposition represents a lane in which the AV 100 is operating. Referring to the example above, a value of the linear temporal logic expression no_lane_change_in_intersection corresponds to whether the AV 100 is changing lanes while operating within the intersection.

In an embodiment, a value of a linear temporal logic expression corresponds to whether the AV 100 is operating in a direction specified by the operating constraint. For example, a linear temporal logic expression corresponding to whether the AV 100 is traveling in a direction specified by the traffic rules of the travel lane is denoted by:
  id: lane_direction
  requirement:
    is_travel_direction_correct
  is_dynamic: 0

The planning module 404 evaluates each linear temporal logic expression by determining a value of each linear temporal logic proposition of one or more linear temporal logic propositions in the linear temporal logic expression. The planning module 404 thus evaluates the linear temporal logic expression by logically aggregating one or more values of the one or more linear temporal logic propositions to derive a value of the linear temporal logic expression. The planning module 404 generates a trajectory by analyzing the AV 100, whose state is evolving continuously in time. To model the AV 100 that evolves continuously in time as a sequence of states, the planning module 404 samples the state of the AV 100 at different times and adds the sampled states to the sequence of states. For example, all the times in which any linear temporal logic proposition (e.g., is_baseline, in_intersection, lane_index, right_line, or left_line) changes are sampled. Thus, for any index i, there are some properties that are different at a state $s_i$ and at s state $s_{\{i+1\}}$.

In an embodiment, the planning module 404 evaluates a linear temporal logic expression by determining values of the linear temporal logic expression for a sequence of states of the AV 100 based on a temporal modal operator. For example, the planning module 404 uses the NEXT temporal modal operator to evaluate operation of the AV 100 in a sequence of states by evaluating the next state in time in the sequence after a state of interest. For example, a linear temporal logic expression defining an operating constraint for the AV 100 is denoted by:
  id: lane_change_lane_to_lane
  requirement:
    is_baseline||in_intersection||
    lane_index<0||NEXT(lane_index)<0||
    (NEXT(lane_index)==lane_index)||
    (NEXT(lane_index)>lane_index            &&
      (right_line==1||right_line==3||right_line==5))||
    (NEXT(lane_index)<lane_index            &&
      (left_line==1||left_line==3||left_line==5))
  is_dynamic: 0

To evaluate the linear temporal logic expression in the example above, the planning module 404 denotes a sequence of states of the AV 100 by $s_0 \, s_1 \, s_2 \ldots$, where 0, 1, and 2 denote indices and $s_0$, $s_1$, and $s_2$ denote the state of the AV 100 at index 0, 1, and 2, respectively. The planning module 404 determines whether at index i, the sequence of states satisfies NEXT(P) for a linear temporal logic proposition P. The planning module 404 evaluates whether state $s_{\{i+1\}}$ satisfies P because $s_{\{i+1\}}$ is the state of the AV 100 after the state at index i.

Continuing with the example above, the planning module 404 evaluates the linear temporal logic proposition NEXT (lane_index)==lane_index. The variable $L_i$ denotes the lane_index at state $s_i$. If NEXT(lane_index)==lane_index is evaluated at the index i, then $L_{\{i+1\}}$ equals $L_i$, e.g., the lane_index at the state i+1 is the same as the lane_index at the state i. In other words, the lane_index does not change from the state i to the state i+1. The planning module 404 then evaluates the proposition (NEXT(lane_index)>lane_index && (right_line==1||right_line==3||right_line==5)) at the index i. If NEXT(lane_index)>lane_index, then $L_{\{i+1\}}>L_i$, e.g., the lane at the state i+1 is to the right of the lane at the state i. The right_line==1 linear temporal logic proposition denotes that the right lane marking at the state i is a broken white line. The right_line==3 linear temporal logic proposition denotes that the right lane marking at the state i is a broken yellow line. The right_line==5 linear temporal logic proposition denotes that the right lane marking at the state i is no line. Therefore, evaluating the combined linear temporal logic proposition (NEXT(lane_index)>lane_index && (right_line==1||right_line==3||right_line==5)) at state i, the planning module 404 determines that the lane at state i+1 is to the right of the lane at state i, and that the right lane marking at state i is either broken white, broken yellow, or no line.

Continuing with the example above, the planning module 404 evaluates the linear temporal logic proposition (NEXT (lane_index)<lane_index            &&
(left_line==1||left_line==3||left_line==5)). This linear temporal logic proposition is similar to the linear temporal logic proposition evaluated above. At the index i, the linear temporal logic denotes that the lane at the state i+1 is to the left of the lane at the state i, and that the left lane marking at the state i is either broken white, broken yellow, or no line. Therefore, the combined linear temporal logic expression (NEXT(lane_index)==lane_index)||(NEXT(lane_index)>lane_index && (right_line==1||right_line==3||right_line==5)) ||(NEXT(lane_index)<lane_index && (left_line==1||left_line==3||left_line==5)) is evaluated to determine that at index i, the AV 100 either (1) doesn't change lanes, (2) changes to the right lane and the right lane boundary is either broken white, broken yellow, or no line, or (3) changes to the left lane and the left lane boundary is either broken white, broken yellow, or no line.

In an embodiment, the planning module 404 determines whether the operating of the AV 100 in accordance with a motion segment violates an operating constraint based on a linear temporal logic expression defining the operating constraint. The determining of whether the operating of the AV 100 in accordance with the motion segment violates the operating constraint is performed responsive to the value of the linear temporal logic expression being false. In an embodiment, the planning module 404 decides to operate the AV 100 in accordance with a selected motion segment even though the operation violates an operating constraint of one or more operating constraints. The operating of the AV 100 in accordance with the selected motion segment violates the operating constraint responsive to the value of a linear temporal logic expression defining the operating constraint being false. For example, a higher-ranked operating constraint specifies that the AV 100 should avoid colliding with the object 1008. A lower-ranked operating constraint specifies a maximum speed limit for the AV 100. The planning module 404 can violate the lower-ranked operating constraint and speed up to obey the higher-ranked operating constraint and avoid a collision.

In an embodiment, the planning module 404 generates a Kripke structure as part of its trajectory generation process. An example of a Kripke structure is illustrated and described in more detail below with reference to FIG. 14. The Kripke structure represents one or more motion segments that are to be evaluated. The Kripke structure is a graph whose vertices represent the reachable states of the AV 100 and whose edges represent state transitions. The planning module 404 evaluates a linear temporal logic expression using the Kripke structure. The Kripke structure includes multiple vertices. A first vertex of the Kripke structure corresponds to an initial spatiotemporal location of the AV 100. A second vertex of the Kripke structure corresponds to a destination spatiotemporal location of the AV 100. An edge of the Kripke structure that connects the first vertex and the second vertex corresponds to a motion segment for operating the AV 100 from the initial spatiotemporal location to the destination spatiotemporal location.

In an embodiment, the planning module 404 randomizes spatiotemporal information obtained from a map of the operating environment 1300 to generate a Kripke structure. The AV 100 receives the map from the remote server 136 or retrieves the map from the data storage unit 142. When the AV 100 is located at an initial spatiotemporal location, it randomizes the spatiotemporal information in the map to generate multiple options or motion segments that it can operate in accordance with. The multiple options or motion segments is used to generate a Kripke structure. The planning module 404 uses the Kripke structure to evaluate each motion segment or option based on one or more linear temporal logic expressions. In an embodiment, the planning module 404 samples spatiotemporal information obtained from the map of the operating environment 1300 to generate the Kripke structure. For example, the planning module 404 selects points in the map that are within a particular distance from the initial spatiotemporal location of the AV 100 to generate multiple motion segments, which are then used to generate a Kripke structure The planning module 404 evaluates a linear temporal logic expression by determining, at each vertex of the multiple vertices, a value of the linear temporal logic expression. The linear temporal logic expression defines a particular operating constraint. In some cases, a first value of the linear temporal logic expression evaluated at the first vertex is different from a second value of the linear temporal logic expression evaluated at the second vertex. The planning module 404 determines that the particular operating constraint is violated responsive to the first value of the linear temporal logic expression evaluated at the first vertex of the Kripke structure being different from the second value of the linear temporal logic expression evaluated at the second vertex of the Kripke structure.

In an embodiment, a value of a linear temporal logic expression changes at an intermediate point on a motion segment. When the value of the linear temporal logic expression changes, the planning module 404 divides the motion segment into two different motion segments at the intermediate point. The dividing of motion segments is illustrated and described in more detail below with reference to FIG. 15. A motion segment is divided at a spatiotemporal location responsive to a value of a linear temporal logic expression changing at the spatiotemporal location. The division is performed to ensure that a value of a linear temporal logic expression changes at most once along a motion segment.

In an embodiment, a set of the possible states of the AV 100 is denoted by S. For example, a particular state s of the AV 100 includes the position, heading, or speed of the AV 100 as well as those of other objects 1008 in the operating environment 1300. In this example, there are a total of n propositional variables of interest $v_1, v_2, \ldots v_n$. Examples of propositional variables are is_baseline, in_intersection, lane_index, left_line and right_line as described in more detail in the example above. The propositional variables abstract the state of the AV 100 to a meaningful quantity for trajectory planning. For example, an (x,y) position of the AV 100 is abstracted to determine whether the (x,y) position causes the AV 100 to be completely located within a lane or within an intersection. The value of $v=(v_1, v_2, \ldots v_n)$ that is evaluated at a state of the AV 100 is referred to as the "label" of that state. For each label $v_i$, $F_i$ denotes a function that receives the state of the AV 100 as input and generates the value of $v_i$ as output. In an embodiment, the planning module 404 evaluates a linear temporal logic expression to determine a lane that the AV 100 is located in at a particular state of the AV 100. For example, if $v_i$ denotes the propositional variable lane_index, then $F_{i(s)}$ returns the lane index of the AV 100 when the system state is s. The function $F=(F_1, F_2, \ldots F_n)$ is referred to as the "labeler" because it turns a state of the AV 100 into the label at that state.

Continuing the example above, E denotes an edge of a Kripke structure. E(d) denotes a state of the AV 100 at a distance d along the edge E, e.g., E(0) denotes the state of the AV 100 at the beginning of the edge E. The planning module 404 considers $d_0=0$ and computes $F=(F_1(E(d_0)), F_2(E(d_0)), \ldots F_n(E(d_0)))$, e.g., the label of the state of the AV 100 at the beginning of the edge E. The planning module 404 determines the smallest $d_1$ such that there exists an index i where $F_i(E(d_1)) \ne F_i(E(d_0))$. The value of $d_1$ is the distance along the edge E where the label changes. The planning module 404 continues in the manner described above to determine values of $d_2, d_3, \ldots d_m$ such that for each $d_j$, there exists an index i such that $F_i(E(d_{\{j-1\}}))!=F_i(E(d_j))$. The values of $d_1, d_2, \ldots d_m$ are the distances along the edge E where the label changes value. If the label does not change along the edge E, then m=0 since $d_1$ will not exist. In the case where m!=0, e.g., there exists a distance along the edge E where the label changes values, the planning module 404 divides the edge E into different edges $E_1, E_2, \ldots E_m$ where each edge E is part of the original edge E, starting from the distance $d_{\{i+1\}}$ to the distance $d_i$. The planning module 404 thus ensures that the resulting sub edges contain at most one change in the label value.

In an embodiment, the planning module 404 generates an operational metric for operating the AV 100 in accordance with a motion segment. The operational metric is based on a determined value of a linear temporal logic expression when the linear temporal logic expression is evaluated based on the motion segment. The operational metric is a cost of operating the AV 100 in accordance with the motion segment. For example, if the planning module 404 predicts that operating the AV 100 in accordance with the motion segment will lead to a collision or violate another traffic rule, the planning module assigns a higher operational metric (cost) to the motion segment. The planning module will avoid operating the AV 100 in accordance with the motion segment to reduce the cost. The use of costs associated with edges in a planning graph is illustrated and described in more detail above with reference to FIG. 10.

In an embodiment, the planning module 404 decides to operate the AV 100 in accordance with a motion segment responsive to an operational metric assigned to the motion segment being less than a threshold value. For example, a graphical representation contains one or more motion segments. The AV 100 receives one or more linear temporal logic expressions defining one or more operating constraints for the AV 100. The planning module 404 evaluates each linear temporal logic expression of the one or more linear temporal logic expressions for each motion segment of the one or more motion segments. Responsive to a value of a linear temporal logic expression being false, the planning module 404 assigns an operational metric (cost) to the motion segment. The planning module selects a motion segment of the one or more motion segments such that the selected motion segment has an assigned operational metric below a threshold value. For example, an operational metric can range from 0 to 99 with 99 being the highest cost. If the threshold value is 5, then a motion segment having an operational metric less than 5 is selected.

In an embodiment, an operating constraint on operating the AV 100 is one of a ranked plurality of operating constraints. For example, an operating constraint having a greater effect on navigational safety is ranked higher. In an embodiment, the planning module 404 generates an operational metric by determining a rank of the operating constraint. For example, if an operating constraint having a rank of 10 is violated, the operational metric will be higher than if an operating constraint having a rank of 1 is violated. In an embodiment, the planning module 404 assigns an operational metric to a motion segment by determining a rank of an operating constraint defined by a linear temporal logic expression that is evaluated to be false. When a linear temporal logic expression is evaluated to be false, the planning module 404 determines that the corresponding operating constraint is violated. The planning module 404 then determines the rank of the violated operating constraint. The planning module 404 assigns the operational metric to the motion segment by denoting the rank of the operating constraint defined by the linear temporal logic expression that was evaluated to be false as the operational metric for the motion segment.

In an embodiment, the AV 100 stores a linear temporal logic expression corresponding to a collision of the AV 100 with an object 1008. The linear temporal logic expression is retrieved from the remote server 136 and stored in the data storage unit 142. For example, the linear temporal logic expression includes a minimum speed of the AV 100 to avoid a collision of the AV 100 with the object 1008. In another example, the linear temporal logic expression includes a minimum acceleration of the AV 100 to avoid a collision of the AV 100 with the object 1008. The AV 100 must therefore speed up to avoid the collision. In an embodiment, the linear temporal logic expression is one of multiple ranked linear temporal logic expressions. A linear temporal logic expression associated with a greater effect on navigational safety will have a higher rank.

The AV 100 receives a first motion segment for operating the AV 100. The first motion segment is associated with a road, a parking lot, a bridge, a construction zone, a curb of a road, a boundary of a lane, or an intersection. For example, operating the AV 100 in accordance with the first motion segment causes the AV 100 to traverse the road, parking lot, or bridge. The planning module 404 determines a first value of the linear temporal logic expression based on the first motion segment. The first value of the linear temporal logic expression is determined to be false. Therefore, the planning module 404 determines that operating the AV 100 in accordance with the first motion segment will cause a collision of the AV 100 with the object 1008. In an embodiment, the planning module 404 determines the first value of the linear temporal logic expression to be false responsive to an operating speed of the AV 100 being greater than a maximum speed limit. For example, if the planning module 404 predicts that the motion segment will cause the AV 100 to speed, the corresponding operating constraint will be violated.

In an embodiment, the planning module 404 determines the first value of the linear temporal logic expression by determining a distance from the AV 100 to the object 1008 based on sensor data obtained from the one or more sensors 1304. For example, if the distance is small and the AV 100 is driving in the direction of the object 1008, the planning module 404 determines that operating the AV 100 in accordance with the first motion segment will cause a collision. In an embodiment, the planning module 404 determines the first value of the linear temporal logic expression to be false responsive to a first probability of collision of the AV 100 with the object 1008 being greater than a threshold value. For example, the threshold value is 10%. The planning module 404 determines the first probability of collision by predicting a trajectory for the object 1008. In an embodiment, the planning module 404 uses an extended Kalman filter to track the object 1008 and determine a time for a potential collision. The planning module 404 determines potential behaviors for the object 1008 (e.g., change of lanes or left turn) and assigns probabilities to each potential behavior. In an embodiment, the planning module 404 determines the first probability of collision for the AV 1000 with the object 1008 relative to a location on a longitudinal axis of the AV 100, wherein the location is situated away from a rear axle of the AV 100.

The planning module generates a Kripke structure representing the first motion segment. In an embodiment, the planning module generates the Kripke structure by determining a lateral error tolerance of the AV 100 with respect to the object 1008 when the AV 100 is operated in accordance with the first motion segment. The lateral error tolerance represents a magnitude of lateral freedom of the AV 100 to steer laterally while avoiding a collision with the object 1008. If the lateral error tolerance is smaller, the AV 100 is laterally closer to the object 1008. The planning module 404 generates the Kripke structure by associating an edge of the Kripke structure corresponding to the first motion segment with the determined lateral error tolerance.

In an embodiment, the planning module 404 transmits a message to the control module 406 to terminate operation of the AV 100 in accordance with the first motion segment. The planning module 404 transmits the message to terminate the operation of the AV 100 responsive to the first probability of collision of the AV 100 with the object 1008 being greater than a threshold value. For example, the threshold value is 5%. Responsive to the determined first value indicating that the first probability of collision of the AV 100 with the object 1008 (e.g., 30%) is greater than the threshold value, the control module 406 operates the AV 100 in accordance with a second motion segment that is different from the first motion segment. The planning module 404 determines that a second value of the linear temporal logic expression determined based on the second motion segment indicates that a second probability of collision of the AV 100 with the object 1008 (e.g., 0%) is less than the threshold value. Therefore, the planning module 404 uses the evaluation of linear temporal logic expressions to select between motion segments based on the probability of collision associated with each motion segment.

In an embodiment, a first operational metric associated with the linear temporal logic expression is greater than a second operational metric associated with a second linear temporal logic expression. The effect of the linear temporal logic expression on navigational safety of the AV 100 is larger than the effect of the second linear temporal logic expression on navigational safety. For example, the second linear temporal logic expression is associated with a level of passenger comfort measured by the one or more passenger sensors 1308 of the AV 100. In an embodiment, the second linear temporal logic expression includes a maximum speed of the AV 100 associated with the level of passenger comfort measured by the passenger sensors 1308. If a particular motion segment will cause the AV 100 to exceed the maximum speed, the planning module 404 assigns the second operational metric to the particular motion segment. In an embodiment, the second linear temporal logic expression includes a maximum acceleration of the AV 100 associated with a level of passenger comfort measured by the passenger sensors 1308. If the particular motion segment will cause the AV 100 to exceed the maximum acceleration, the planning module 404 assigns the second operational metric to the particular motion segment. Thus the second operational metric is the cost (a lower level of passenger comfort) of operating the AV 100 in accordance with the particular motion segment (acceleration exceeding the maximum limit).

The control module 406 operates the AV 100 in accordance with the trajectory generated by the planning module 404 as described above. The control module 406 is illustrated and described above with reference to FIG. 4. The control module can operate the AV 100 in accordance with a selected motion segment. In an embodiment, the control module 406 operates the AV 100 in accordance with a motion segment having a lower operational metric such that the operational metric is minimized across the trajectory. The control module 406 operates the AV 100 to avoid a collision with an object 1008 identified by the perception module 402. The control module 406 uses the trajectory from the planning module 404 to operate the brakes 420c, steering 420a, and throttle 420b (illustrated and described above with reference to FIG. 4) of the AV 100. In an embodiment, the control module 406 operates the AV 100 within a discretized drivable area of the operating environment 1300 in accordance with the trajectory.

Examples of Autonomous Vehicle Operation Using Linear Temporal Logic

Figure 14:
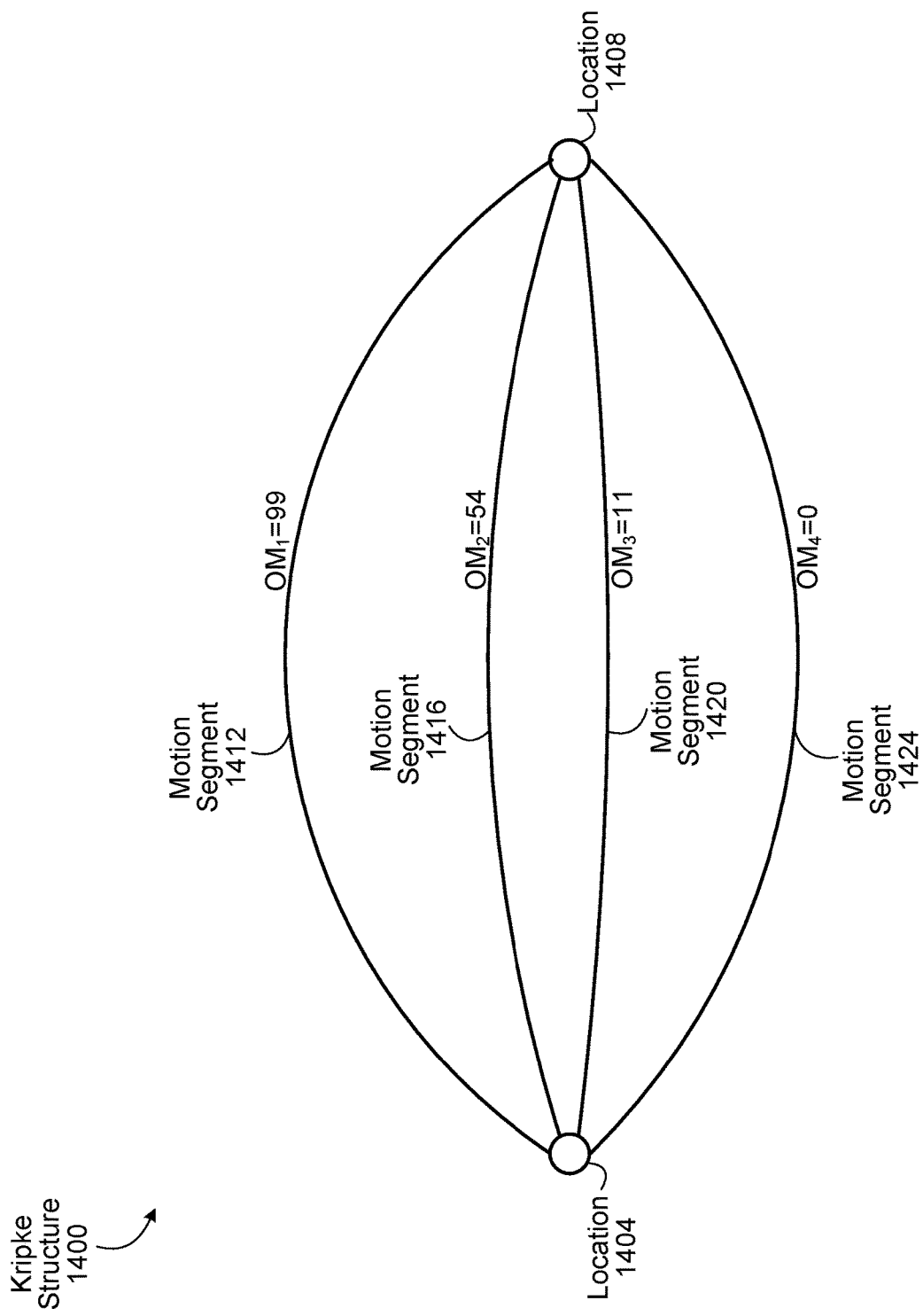
FIGS. 14-15 show examples of autonomous vehicle operation using linear temporal logic, in accordance with one or more embodiments.

FIG. 14 shows an example of autonomous vehicle operation using linear temporal logic, in accordance with one or more embodiments. In an embodiment, AV 100 receives multiple motion segments (motion segments 1412, 1416, 1420, 1424) from the remote server 136 for navigating the AV 100. In other embodiments, the planning module 404 generates the multiple motion segments using the graph 1000 described in more detail in FIG. 10 above. In other embodiments, the planning module 404 generates the multiple motion segments using the methods described in more detail in FIG. 13 above. Each motion segment (e.g., motion segment 1412) of the multiple motion segments connects a first spatiotemporal location 1404 to a second spatiotemporal location 1408. For example, a motion segment is associated with a road, a parking lot, a bridge, a construction zone, a curb of a road, a boundary of a lane, or an intersection in the operating environment 1300.

The planning module 404 generates a Kripke structure 1400 including a first vertex corresponding to the first spatiotemporal location 1404 and a second vertex corresponding to the second spatiotemporal location 1408. The Kripke structure 1400 further includes multiple edges. Each edge of the multiple edges corresponds to a respective motion segment (e.g., motion segment 1412) of the multiple motion segments. The AV 100 receives one or more linear temporal logic expressions defining operating constraints for operating the AV 100. In an embodiment, the AV 100 receives the linear temporal logic expressions from the remote sever 136. In other embodiments, the AV 100 retrieves the linear temporal logic expressions from the data storage unit 142. Each linear temporal logic expression defines a respective operating constraint for operating the AV 100. For example, a first operating constraint specifies that the AV 100 should not collide with another object (e.g., the object 1008). A second operating constraint specifies that the AV 100 should not exceed a maximum speed limit to obey traffic rules. A third operating constraint specifies that the AV 100 should not exceed a maximum acceleration in order to provide a particular level of passenger comfort.

In an embodiment, the planning module 404 generates the Kripke structure 1400 by determining for each motion segment (e.g., motion segment 1412) a lateral error tolerance of the AV 100 with respect to an object 1008 when the AV 100 is operated in accordance with the motion segment 1412. For example, if the determined lateral error tolerance is smaller, the AV 100 has less room to maneuver laterally and a collision with the object 1008 is more likely. The planning module 404 generates the Kripke structure 1400 by associating each edge of the multiple edges with the determined lateral error tolerance. In an embodiment, a linear temporal logic expression includes a minimum speed of the AV 100 to avoid a collision of the AV 100 with the object 1008. If a particular motion segment (e.g., traveling up a hill) specifies that the AV 100 will travel slower than the minimum speed, the AV 100 will not be able to get out of the way of the object 1008 and a collision with the object 1008 is more likely. In an embodiment, a linear temporal logic expression includes a minimum acceleration of the AV 100 to avoid a collision of the AV 100 with the object 1008. If a particular motion segment specifies that the AV 100 will accelerate slower than the minimum acceleration, the AV 100 will not be able to get out of the way of the object 1008 and a collision with the object 1008 is more likely.

The planning module 404 uses the Kripke structure 1400 to select a motion segment (e.g., motion segment 1424) of the multiple motion segments for operating the AV 100 from the first spatiotemporal location 1404 to the second spatiotemporal location 1408. For the multiple edges corresponding to the motion segments, the planning module 404 evaluates each linear temporal logic expression using the Kripke structure 1400. If a value of a linear temporal logic expression determined at either the first vertex or the second vertex is false for an edge, the planning module 404 assigns an operational metric (e.g., $OM_1=99$) to the respective motion segment (e.g., the motion segment 1412). The operational metric $OM1=99$ is a cost of violating the operating constraint defined by the linear temporal logic expression. In an embodiment, if the value of a linear temporal logic expression determined at the first vertex does not match the value at the second vertex for a particular edge, operating the AV 100 in accordance with the respective motion segment will violate the operating constraint defined by the linear temporal logic expression.

Continuing the example above, a first operating constraint specifies that the AV 100 should not collide with the object 1008. A first linear temporal logic expression defining the operating constraint is therefore associated with a probability of collision of the AV 100 with the object 1008. For example, if the probability of a collision is higher, the planning module 404 assigns a higher operational metric to the motion segment that violates the first operating constraint. In an embodiment, the planning module 404 assigns an operational metric by determining a distance from the AV 100 to the object 1008 based on sensor data obtained from the one or more sensors 1304. For example, if the AV 100 is closer to the object 1008, the probability of a collision and thus the operational metric will be higher. The operational metric increases as the distance from the AV 100 to the object 1008 decreases. For example, the planning module 404 determines that the motion segment 1412 will cause a collision and the probability of the collision is higher. Therefore a higher operational metric $OM_1=99$ is assigned to the motion segment 1412.

In an embodiment, the value of the linear temporal logic expression is determined to be false responsive to the probability of collision of the AV 100 with the object 1008 being greater than a threshold value. For example, if the probability of a collision of the AV 100 with the object 1008 is 80% and the threshold value is 5%, the value of the linear temporal logic expression is determined to be false.

In an embodiment, each linear temporal logic expression is one of multiple ranked linear temporal logic expressions. The ranking is based on the effect of each defined operating constraint on navigational safety. For example, an operational metric of a first linear temporal logic expression of the multiple ranked linear temporal logic expressions is greater than an operational metric of a second linear temporal logic expression of the multiple ranked linear temporal logic expressions.

Continuing the example above, a second operating constraint specifies that the AV 100 should not exceed a maximum speed limit to obey traffic rules. A value of a second linear temporal logic expression defining the second operating constraint is therefore determined to be false responsive to an operating speed of the AV 100 being greater than the maximum speed limit. For example, the motion segment 1416 causes the AV 100 to speed up to avoid a collision with the object 1008. Thus, a collision is avoided and the first operating constraint is not violated. But the second operation constraint is violated. The planning module 404 assigns the operational metric $OM_2=54$ to the motion segment 1416. The cost $OM_2$ (54) is less than $OM_1$ (99) because exceeding the maximum speed limit has a lower effect on navigational safety than a collision.

In an embodiment, a linear temporal logic expression is associated with a level of passenger comfort measured by one or passenger sensors 1308 of the AV 100. Continuing the example above, the third operating constraint specifies that the AV 100 should not exceed a maximum acceleration in order to provide a particular level of passenger comfort. A third linear temporal logic expression defining the third operating constraint therefore includes a maximum speed or a maximum acceleration of the AV 100 associated with the particular level of passenger comfort. For example, the planning module 404 determines that operating the AV 100 in accordance with the motion segment 1420 will cause the AV 100 to violate the third operating constraint. However, the third operating constraint has less effect on navigational safety. Operating in accordance with the motion segment 1420 will avoid a collision and will also not cause speeding of the AV 100. Thus a lower cost $OM_3=11$ is assigned to the motion segment 1420. By determining the respective operational metrics, the planning module 404 can decide to operate the AV 100 in violation of the lower-ranked third operating constraint while obeying the higher-ranked first operating constraint. Finally, operating the AV 100 in accordance with the motion segment 1424 obeys all three operating constraints. Thus an operational metric $OM_4=0$ is assigned to the motion segment 1424.

In an embodiment, the planning module 404 terminates generation of a trajectory including the motion segments 1412, 1416, 1420. For example, the planning module 404 terminates generation of the trajectory responsive to an operational metric assigned to a motion segment being greater than a threshold value. If the threshold value is 9, the planning module 404 will not use motion segment 1412 having the operational metric $OM_1=99$. In an embodiment, the planning module 404 selects a motion segment associated with a lowest operational metric to operate the AV 100. For example, the planning module 404 selects motion segment 1424 having the lowest operational metric $OM_4=0$. The planning module 404 transmits a message to the control module 406 to operate the AV 100 in accordance with the selected motion segment 1424.

Figure 15:
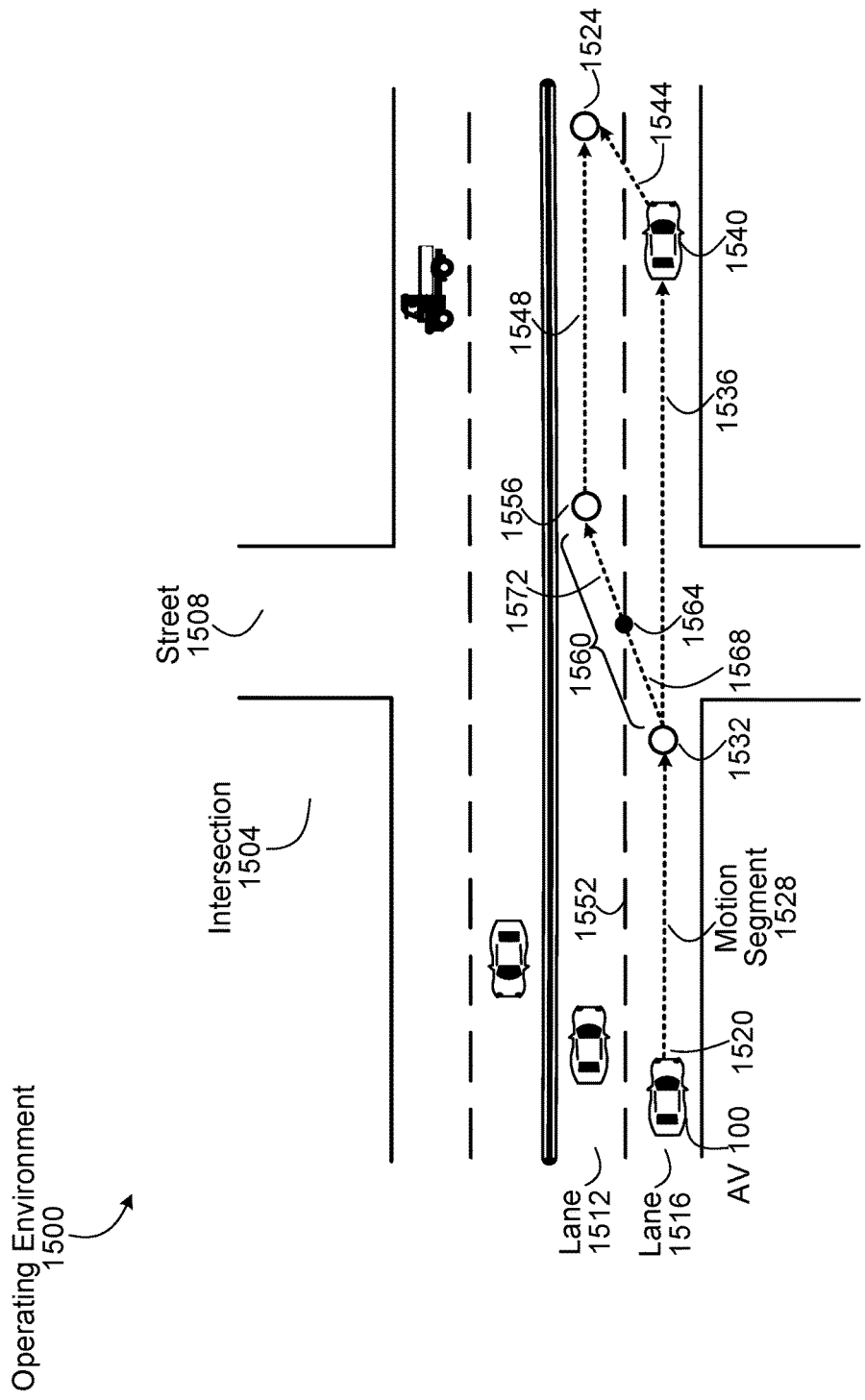

FIG. 15 shows an example of autonomous vehicle operation using linear temporal logic, in accordance with one or more embodiments. The operating environment 1500 shown in FIG. 15 includes an intersection 1504 of a street 1508 with multiple lanes 1512, 1516, etc. The operating environment 1500 includes an initial spatiotemporal location 1520 at which the AV 100 is located and a destination spatiotemporal location 1524 that the AV 100 is traveling to. The planning module 404 is determining a trajectory from the initial spatiotemporal location 1520 to the destination spatiotemporal location 1524. The initial spatiotemporal location 1520 is located within lane 1516 and the destination spatiotemporal location 1524 is located within lane 1512.

The operating environment 1500 includes a motion segment 1528 from the initial spatiotemporal location 1520 to the spatiotemporal location 1532. A motion segment 1536 connects the spatiotemporal location 1532 to the spatiotemporal location 1540. A motion segment 1544 connects the spatiotemporal location 1540 to the destination spatiotemporal location 1524. However, navigating the AV 100 in accordance with the motion segment 1536 along lane 1516 will be slower because there is another vehicle located at the spatiotemporal location 1540. A motion segment 1560 connects the spatiotemporal location 1532 to the spatiotemporal location 1556 and includes a change of lane from lane 1516 to lane 1512 at the spatiotemporal location 1564. A motion segment 1548 connects the spatiotemporal location 1556 to the destination spatiotemporal location 1524. Navigating the AV 100 in accordance with the motion segment 1560 and changing lanes at the spatiotemporal location 1532 will be faster because the AV 100 will avoid the vehicle located at the spatiotemporal location 1540. However, the motion segment 1560 causes the AV 100 to change lanes within the intersection 1504. An operating constraint defined by a linear temporal logic expression received by the AV 100 specifies that the AV 100 should not change lanes within an intersection. An example of a linear temporal logic expression no_lane_change_in_intersection defining such an operating constraint is described and evaluated in more detail above with reference to FIG. 13.

The linear temporal logic expression includes one or more linear temporal logic propositions as described in more detail above FIG. 13. For example, a first linear temporal logic proposition in_intersection corresponds to whether the vehicle is located within an intersection. A second linear temporal logic proposition corresponds to a lane in which the vehicle is operating. For example, as described in more detail above, is_baseline is a propositional variable denoting the spatiotemporal location of the AV 100. A value of the linear temporal logic expression no_lane_change_in_intersection therefore corresponds to whether the AV 100 is changing the lane in which the AV 100 is operating while the AV 100 is operating within the intersection 1504.

In an embodiment, a value of a linear temporal logic expression corresponds to whether the AV 100 is operating in a direction specified by an operating constraint. For example, an operating constraint specifies that the AV 100 should operate in the direction of lanes 1512, 1516. Such an operating constraint is defined by a temporal logic expression as follows:
 id: lane_direction
 requirement:
  is_travel_direction_correct
 is_dynamic: 0
The temporal logic expression lane_direction above is evaluated similarly to the expression no_lane_change_in_intersection.

The planning module 404 stores a Kripke structure representing the motion segments 1528, 1536, 1544, 1560, 1548 for operating the AV 100 in the data storage unit 142 for processing. In an embodiment, the planning module 404 generates the Kripke structure using the methods described in more detail above with reference to FIGS. 13, 14. In other embodiments, the planning module 404 receives the Kripke structure from the remote server 136. Each of the motion segments (e.g., the motion segment 1560) includes multiple spatiotemporal locations (e.g., the spatiotemporal locations 1532, 1564, 1556). Each vertex of multiple vertices of the Kripke structure corresponds to a respective spatiotemporal location of the multiple spatiotemporal locations. An edge of the Kripke structure connecting a first vertex and a second vertex corresponds to a motion segment (e.g., motion segment 1528) for operating the AV 100 from a first spatiotemporal location (e.g., initial spatiotemporal location 1520) to a second spatiotemporal location (e.g., spatiotemporal location 1532).

The planning module 404 evaluates each motion segment (e.g., motion segment 1560) using the linear temporal logic expression based on the Kripke structure. The Kripke structure includes an edge corresponding to each motion segment as shown and described in more detail above with reference to FIG. 14. For each spatiotemporal location of the multiple spatiotemporal locations 1532, 1564, 1556 of the motion segment 1560, the planning module 404 evaluates the linear temporal logic expression based on the Kripke structure. The evaluation of the linear temporal logic expression no_lane_change_in_intersection is described in more detail above with reference to FIG. 13. In the example of FIG. 15, a first value of the linear temporal logic expression no_lane_change_in_intersection evaluated at a first vertex corresponding to the spatiotemporal location 1532 is different from a second value of the linear temporal logic expression evaluated at a second vertex corresponding to the spatiotemporal location 1556.

The planning module 404 determines whether operating the AV 100 in accordance with the motion segment 1560 violates the operating constraint defined by no_lane_change_in_intersection. For example, the planning module 404 determines that the motion segment 1560 violates the operating constraint responsive to the value of the linear temporal logic expression no_lane_change_in_intersection being false at one vertex of the Kripke structure. Because the motion segment 1560 will cause the AV 100 to change lanes within the intersection 1504 at spatiotemporal location 1564, a value of the linear temporal logic expression no_lane_change_in_intersection changes at the spatiotemporal location 1564. Responsive to determining this change in value, the planning module 404 inserts a location marker within the Kripke structure at the spatiotemporal location 1564 to divide the motion segment 1560 into two different motion segments 1568, 1572. The motion segment 1568 connects the spatiotemporal location 1532 to the spatiotemporal location 1564. The motion segment 1572 connects the spatiotemporal location 1564 to the spatiotemporal location 1556.

The planning module 404 assigns an operational metric to each motion segment of the two different motion segments 1568, 1572 based on the location marker. In an embodiment, the planning module 404 assigns the operational metric by determining a rank of the operating constraint. The operating constraint is one of a ranked plurality of operating constraints. Another operating constraint that specifies no collisions is ranked higher. For example, the planning module assigns a lower operational metric to each of the motion segments 1568, 1572 because the two motion segments involve a rule violation that does not include a collision in the example of FIG. 15. The planning module determines or generates a trajectory for operating the AV 100 based on the operational metrics of each motion segment. In an embodiment, an operational metric across the trajectory is minimized. For example, the AV 100 decides to operate in accordance with the motion segments 1536, 1544 because they have a lower total cost. In an embodiment, operating the AV 100 in accordance with the determined trajectory is responsive to an operational metric on the trajectory being less than a threshold value. For example, if the threshold value is 50 and the operational metric assigned to the motion segment 1568 is 60, the trajectory will avoid the motion segment 1568. The control module 406 operates the AV 100 in accordance with the determined trajectory.

Processes for Autonomous Vehicle Operation Using Linear Temporal Logic

Figure 16:
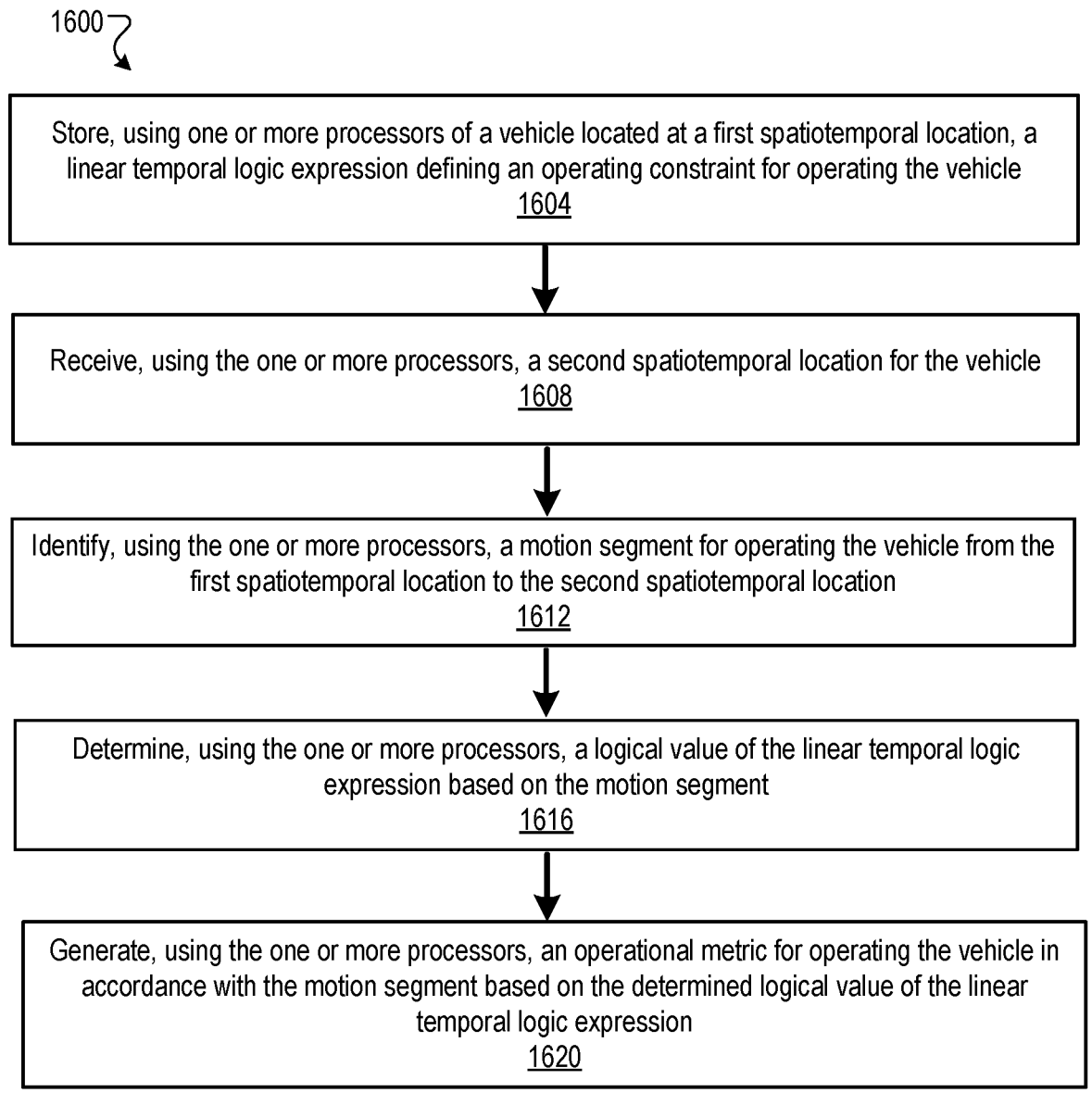

FIG. 16 shows a process 1600 for autonomous vehicle operation using linear temporal logic, in accordance with one or more embodiments. In one embodiment, the process of FIG. 16 is performed by the AV 100. Other entities, for example, one or more components of the remote server 136 perform some or all of the steps of the process 1600 in other embodiments. Likewise, embodiments may include different and/or additional steps, or perform the steps in different orders.

The AV 100 uses one or more processors to store 1604 a linear temporal logic expression defining an operating constraint for operating the AV 100. The AV 100 is located at a first spatiotemporal location (e.g., the spatiotemporal location 1404). A linear temporal logic expression is a formula expressing whether an operating condition of the AV 100 will eventually be true or whether the operating condition of the AV 100 will be true until another condition is satisfied, etc. An operating constraint is a rule that the AV 100 is intended to follow when operating in the operating environment 1300. The operating constraint is a traffic rule or a constraint that increases the level of passenger comfort for a passenger riding in the AV 100.

The AV 100 uses the one or more processors to receive 1608 a second spatiotemporal location (e.g., the spatiotemporal location 1408) for the AV 100. For example, the AV 100 can receive the second spatiotemporal location 1408 from the remote server 136.

The AV 100 uses the one or more processors to identify 1612 a motion segment (e.g., the motion segment 1420) for operating the AV 100 from the first spatiotemporal location 1404 to the second spatiotemporal location 1408. For example, the AV 100 identifies the motion segment 1420 based on sensor data. A motion segment is a portion of the drivable area of the operating environment 1300. For example, a motion segment includes a lane, a section of a street, or an intersection. A motion segment specifies, e.g., a speed of the AV 100, an acceleration of the AV 100, or a directional orientation of the AV 100 when the AV 100 is operating in accordance with the motion segment.

The AV 100 uses the one or more processors to determine 1616 a value of the linear temporal logic expression based on the motion segment 1420. For example, the value is true if the motion segment 1420 obeys the operating constraint or false if the motion segment 1420 violates the operating constraint. The AV 100 evaluates the linear temporal logic expression by determining a value of each linear temporal logic proposition in the linear temporal logic expression. The AV 100 thus evaluates the linear temporal logic expression by logically aggregating one or more values of the one or more linear temporal logic propositions to derive a value of the linear temporal logic expression.

The AV 100 uses the one or more processors to generate 1620 an operational metric (e.g., the operational metric $OM_3$) for operating the AV 100 in accordance with the motion segment 1420 based on the determined value of the linear temporal logic expression. The operational metric $OM_3$ is a cost of operating the AV 100 in accordance with the motion segment 1420. For example, if the AV 100 predicts that operating in accordance with the motion segment 1420 will lead to a collision, the AV 100 assigns a higher operational metric (cost) to the motion segment 1420. The AV 100 will avoid operating in accordance with the motion segment 1420 to reduce the cost.

Figure 17:
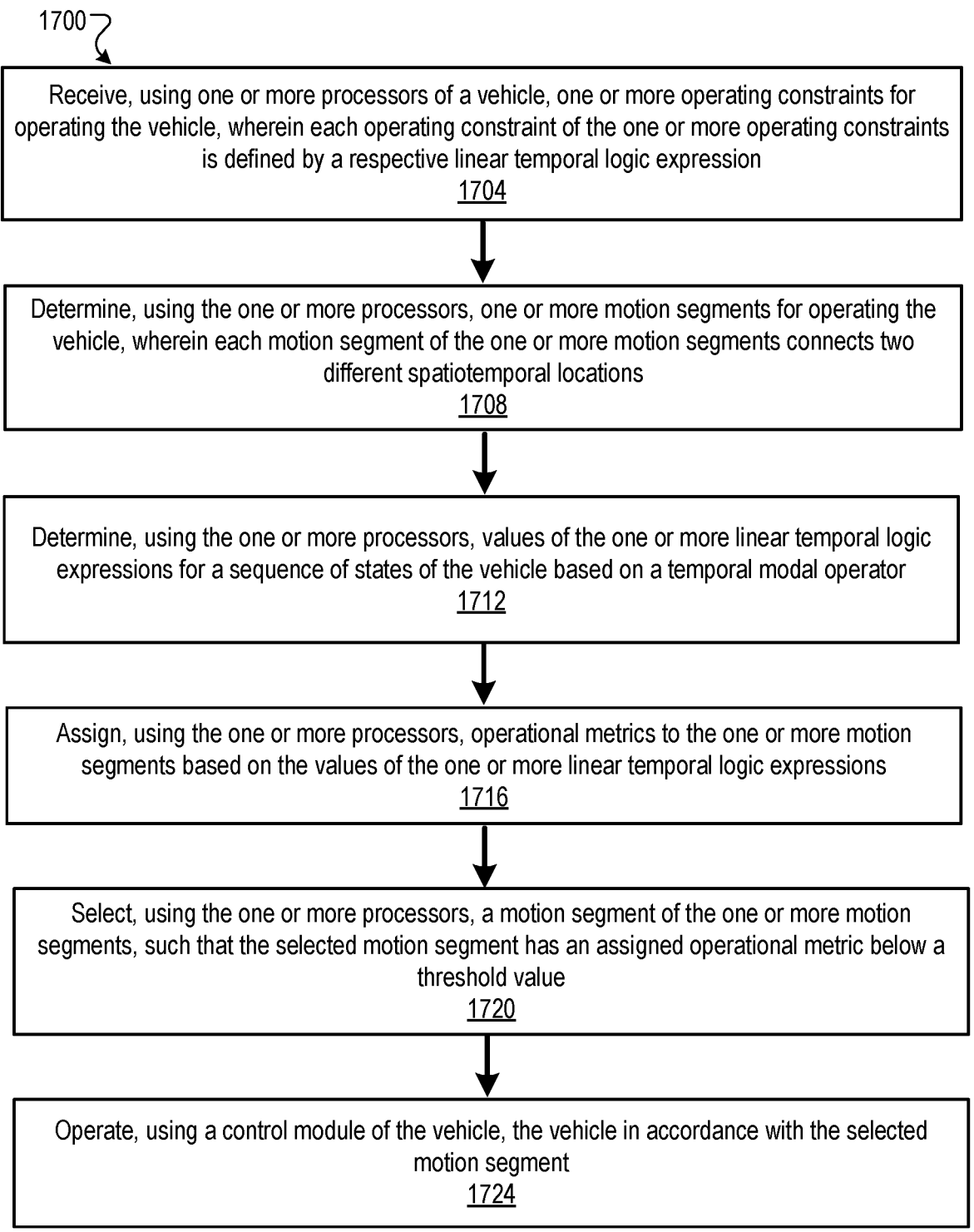

FIG. 17 shows a process 1700 for autonomous vehicle operation using linear temporal logic, in accordance with one or more embodiments. In one embodiment, the process of FIG. 17 is performed by the AV 100. Other entities, for example, one or more components of the remote server 136 perform some or all of the steps of the process 1700 in other embodiments. Likewise, embodiments may include different and/or additional steps, or perform the steps in different orders.

The AV 100 uses one or more processors to receive 1704 one or more operating constraints for operating the AV 100. Each operating constraint of the one or more operating constraints is defined by a respective linear temporal logic expression. In an embodiment, the AV 100 receives the one or more operating constraints from the remote server 136. In other embodiments, the AV 100 retrieves the one or more operating constraints from the data storage unit 142.

The AV 100 uses the one or more processors to determine 1708 one or more motion segments (e.g., the motion segments 1412, 1416, 1420, and 1424) for operating the AV 100. Each motion segment of the one or more motion segments connects two different spatiotemporal locations, for example, the first spatiotemporal location 1404 and the second spatiotemporal location 1408. A motion segment is a portion of the drivable area of the operating environment 1300. For example, a motion segment includes a lane, a section of a street, or an intersection. A motion segment specifies a speed of the AV 100, an acceleration of the AV 100, or a directional orientation of the AV 100 when the AV 100 is operating in accordance with the motion segment.

The AV 100 uses the one or more processors to determine 1712 values of the one or more temporal logic expressions based on a temporal modal operator, e.g., the NEXT operator. For example, a value is true if a motion segment 1420 obeys an operating constraint or false if the motion segment 1420 violates the operating constraint. The AV 100 evaluates a linear temporal logic expression by determining a value of each linear temporal logic proposition of one or more linear temporal logic propositions in the linear temporal logic expression. The AV 100 thus evaluates the linear temporal logic expression by logically aggregating one or more values of the one or more linear temporal logic propositions to derive a value of the linear temporal logic expression.

Responsive to a value of the each linear temporal logic expression being false, the AV 100 uses the one or more processors to assign 1716 an operational metric (e.g., the operational metric $OM_3$) to the motion segment 1420. The operational metric $OM_3$ is a cost of operating the AV 100 in accordance with the motion segment 1420. For example, if the AV 100 predicts that operating in accordance with the motion segment 1420 will lead to a collision, the AV 100 assigns a higher operational metric (cost) to the motion segment 1420. The AV 100 will avoid operating in accordance with the motion segment 1420 to reduce the cost.

The AV 100 uses the one or more processors to select 1720 a motion segment (e.g., the motion segment 1424) of the one or more motion segments, such that the selected motion segment 1424 has an assigned operational metric $OM_4$ below a threshold value. For example, if the threshold value is 5, the motion segment 1424 will be selected because $OM_4=0$. If more than one motion segment has an operational metric below the threshold value (e.g., a threshold value of 15), the threshold value is be lowered or the motion segment 1424 having the least operational metric 0 is selected.

The AV 100 uses a control module (e.g., the control module 406) to operate in accordance with the selected motion segment 1424 as described above with reference to FIG. 13.

FIG. 18 shows a process 1800 for autonomous vehicle operation using linear temporal logic, in accordance with one or more embodiments. In one embodiment, the process of FIG. 18 is performed by the AV 100. Other entities, for example, one or more components of the remote server 136 perform some or all of the steps of the process 1800 in other embodiments. Likewise, embodiments may include different and/or additional steps, or perform the steps in different orders.

The AV 100 uses one or more processors to receive 1804 multiple motion segments, e.g., the motion segments 1412, 1416, 1420, and 1424. Each motion segment of the multiple motion segments connects a first spatiotemporal location (e.g., spatiotemporal location 1404) to a second spatiotemporal location (e.g., spatiotemporal location 1408). A motion segment is a portion of the drivable area of the operating environment 1300. For example, a motion segment includes a lane, a section of a street, or an intersection. A motion segment specifies a speed of the AV 100, an acceleration of the AV 100, or a directional orientation of the AV 100 when the AV 100 is operating in accordance with the motion segment.

The AV 100 uses the one or more processors to generate 1808 a Kripke structure (e.g., the Kripke structure 1400). The Kripke structure 1400 includes a first vertex corresponding to the first spatiotemporal location 1404 and a second vertex corresponding to the second spatiotemporal location 1408. The Kripke structure 1400 further includes multiple edges, wherein each edge of the multiple edges corresponds to a respective motion segment of the multiple motion segments.

The AV 100 uses the one or more processors to receive 1812 a linear temporal logic expression defining an operating constraint for operating the AV 100. For example, the operating constraint specifies that the AV 100 should not collide with an object (e.g., the object 1008). A linear temporal logic expression is a formula expressing whether an operating condition of the AV 100 will eventually be true or whether the operating condition of the AV 100 will be true until another condition is satisfied, etc. An operating constraint is a rule that the AV 100 is intended to follow when operating in the operating environment 1300. The operating constraint is a traffic rule or a constraint that increases the level of passenger comfort for a passenger riding in the AV 100.

For each edge of the multiple edges within the Kripke structure 1400, responsive to a value of the linear temporal logic expression determined at either the first vertex or the second vertex being false, the AV 100 assigns 1816 an operational metric (e.g., $OM_1=99$) to a motion segment (e.g., motion segment 1412) corresponding to the edge. The operational metric $OM_1$ is a cost of operating the AV 100 in accordance with the motion segment 1412. For example, if the AV 100 predicts that operating in accordance with the motion segment 1412 will lead to a collision, the AV 100 assigns a higher operational metric (99) to the motion segment 1412.

The AV 100 uses the one or more processors to select 1820 a motion segment (e.g., motion segment 1424) associated with a lowest operational metric to operate the AV 100. For example, the AV 100 selects motion segment 1424 having the lowest operational metric $OM_4=0$. The planning module 404 transmits a message to the control module 406 to operate the AV 100 in accordance with the selected motion segment 1424.

FIG. 19 shows a process 1900 for autonomous vehicle operation using linear temporal logic, in accordance with one or more embodiments. In one embodiment, the process of FIG. 19 is performed by the AV 100. Other entities, for example, one or more components of the remote server 136 perform some or all of the steps of the process 1900 in other embodiments. Likewise, embodiments may include different and/or additional steps, or perform the steps in different orders.

The AV 100V uses one or more processors to store 1904 a Kripke structure representing a motion segment (e.g., the motion segment 1560) for operating the AV 100. The motion segment 1560 includes multiple spatiotemporal locations (e.g., the spatiotemporal locations 1532, 1564, 1556). The Kripke structure includes a first vertex corresponding to the spatiotemporal location 1532 and a second vertex corresponding to the spatiotemporal location 1556. The Kripke structure further includes an edge that corresponds to the motion segment 1560.

For each spatiotemporal location (e.g., the spatiotemporal location 1564) of the multiple spatiotemporal locations: the AV 100 uses the one or more processors to evaluate 1908 a linear temporal logic expression based on the Kripke structure. The linear temporal logic expression defines an operating constraint for operating the AV 100 in accordance with the motion segment 1560. For example, the operating constraint defined by the linear temporal logic expression specifies that the AV 100 should not change lanes within an intersection. An example of a linear temporal logic expression no_lane_change_in_intersection defining such an operating constraint is described and evaluated in more detail above with reference to FIG. 13.

Responsive to a value of the linear temporal logic expression changing at the spatiotemporal location 1564, the AV 100 uses the one or more processors to insert 1912 a location marker within the Kripke structure at the spatiotemporal location 1564. The AV 100 thus divides the motion segment 1560 into two different motion segments (e.g., the motion segments 1568, 1572).

The AV 100 uses the one or more processors to assign 1916 an operational metric to each motion segment (e.g., the motion segment 1568) of the two different motion segments 1568, 1572 based on the location marker at the spatiotemporal location 1564. In an embodiment, the AV 100 assigns the operational metric by determining a rank of the operating constraint. The operating constraint is one of a ranked plurality of operating constraints. Another operating constraint that specifies no collisions is ranked higher. For example, the AV 100 assigns a lower operational metric to each of the motion segments 1568, 1572 because the two motion segments involve a rule violation that does not include a collision.

The AV 100 uses the one or more processors to determine 1920 a trajectory for operating the AV 100 based on the operational metric. In an embodiment, the operational metric across the trajectory is minimized. For example, the AV 100 determines to operate in accordance with the motion segments 1536, 1544 because they have a lower total cost.

FIG. 20 shows a process 2000 for autonomous vehicle operation using linear temporal logic, in accordance with one or more embodiments. In one embodiment, the process of FIG. 20 is performed by the AV 100. Other entities, for example, one or more components of the remote server 136 perform some or all of the steps of the process 2000 in other embodiments. Likewise, embodiments may include different and/or additional steps, or perform the steps in different orders.

The AV 100 uses one or more processors to store 2004 a linear temporal logic expression corresponding to a collision of the AV 100 with an object (e.g., object 1008). The linear temporal logic expression is retrieved from the remote server 136 and stored in the data storage unit 142. For example, the linear temporal logic expression includes a minimum speed of the AV 100 to avoid a collision of the AV 100 with the object 1008.

The AV 100 uses the one or more processors to receive 2008 a first motion segment (e.g., motion segment 1412) for operating the AV 100. The first motion segment 1412 is associated with a road, a parking lot, a bridge, a construction zone, a curb of a road, a boundary of a lane, or an intersection. For example, operating the AV 100 in accordance with the first motion segment 1412 causes the AV 100 to traverse the road, parking lot, or bridge.

The AV 100 uses the one or more processors to determine 2012 a first value of the linear temporal logic expression based on the first motion segment 1412. For example, the first value of the linear temporal logic expression is determined to be false. Therefore, the AV 100 determines that operating the AV 100 in accordance with the first motion segment 1412 will cause a collision of the AV 100 with the object 1008. The AV 100 further determines that a first probability of collision of the AV 100 with the object 1008 is greater than a threshold value. For example, the threshold value is 5% and the first probability of collision is 30%.

Responsive to the determined first value indicating that the first probability of collision of the AV 100 with the object 1008 is greater than the threshold value, the AV 100 uses the control module 406 to operate 2016 the AV 100 in accordance with a second motion segment (e.g., the motion segment 1424) that is different from the first motion segment 1412. A second value of the linear temporal logic expression determined based on the second motion segment 1424 indicates that a second probability of collision of the AV 100 with the object 1008 is less than the threshold value. For example, the second probability of collision is 0%.

Additional Embodiments

In some embodiments, one or more processors of a vehicle receive one or more operating constraints for operating the vehicle. Each operating constraint of the one or more operating constraints is defined by a respective linear temporal logic expression. The one or more processors determine one or more motion segments for operating the vehicle. Each motion segment of the one or more motion segments connects two different spatiotemporal locations. The one or more processors determine values of the one or more linear temporal logic expressions for a sequence of states of the vehicle based on a temporal modal operator. The one or more processors assign operational metrics to the one or more motion segments based on the values of the one or more linear temporal logic expressions. The one or more processors select a motion segment of the one or more motion segments, such that the selected motion segment has an assigned operational metric below a threshold value. A control module of the vehicle operates the vehicle in accordance with the selected motion segment.

In some embodiments, the assigning of the operational metrics to the one or more motion segments includes determining ranks of the one or more operating constraints.

In some embodiments, the assigning of the operational metrics further includes denoting a rank of an operating constraint defined by a linear temporal logic expression as the operational metric for the motion segment.

In some embodiments, the one or more processors divide a motion segment of the one or more motion segments into two different motion segments at a spatiotemporal location.

In some embodiments, the dividing of the motion segment is performed responsive to a value of a linear temporal logic expression changing at the spatiotemporal location.

In some embodiments, the determining of the values of the one or more linear temporal logic expressions includes evaluating each linear temporal logic proposition of the one or more linear temporal logic propositions.

In some embodiments, each linear temporal logic expression includes one or more linear temporal logic propositions.

In some embodiments, the determining of the values of the one or more linear temporal logic expressions further includes aggregating the evaluated each linear temporal logic proposition of the one or more linear temporal logic propositions.

In some embodiments, the one or more processors randomize spatiotemporal information obtained from a map of the environment within which the vehicle is located to generate a Kripke structure.

In some embodiments, the one or more processors sample spatiotemporal information obtained from a map of the environment within which the vehicle is located to generate the Kripke structure.

In some embodiments, an operating constraint is violated responsive to a first value of a linear temporal logic expression evaluated at a first vertex of the Kripke structure being different from a second value of the linear temporal logic expression evaluated at a second vertex of the Kripke structure. The linear temporal logic expression defines the operating constraint.

In some embodiments, the determining of the values of the one or more linear temporal logic expressions includes determining whether a value of a linear temporal logic expression is true or false.

In some embodiments, the operating of the vehicle in accordance with the selected motion segment violates an operating constraint of the one or more operating constraints.

In some embodiments, the operating of the vehicle in accordance with the selected motion segment violates the operating constraint, responsive to a value of a linear temporal logic expression defining the operating constraint being false.

In some embodiments, a Kripke structure is generated.

In some embodiments, a first vertex of the Kripke structure corresponds to a first spatiotemporal location of the two different spatiotemporal locations of the vehicle.

In some embodiments, a second vertex of the Kripke structure corresponds to a second spatiotemporal location of the two different spatiotemporal locations.

In some embodiments, an edge of the Kripke structure connecting the first vertex and the second vertex corresponds to a motion segment for operating the vehicle from the first spatiotemporal location to the second spatiotemporal location.

In some embodiments, the Kripke structure includes multiple vertices.

In some embodiments, the determining of the values of the one or more linear temporal logic expressions includes evaluating, at each vertex of the multiple vertices, the one or more linear temporal logic expressions.

In some embodiments, one or more processors of a vehicle receive multiple motion segments. Each motion segment of the multiple motion segments connects a first spatiotemporal location to a second spatiotemporal location. The one or more processors generate a Kripke structure including a first vertex corresponding to the first spatiotemporal location, a second vertex corresponding to the second spatiotemporal location, and multiple edges. Each edge of the multiple edges corresponds to a respective motion segment of the multiple motion segments. The one or more processors receive a linear temporal logic expression defining an operating constraint for operating the vehicle. For each edge of the multiple edges within the Kripke structure: responsive to a value of the linear temporal logic expression determined at either the first vertex or the second vertex being false, an operational metric is assigned to a motion segment corresponding to the edge. The one or more processors select a motion segment associated with a lowest operational metric to operate the vehicle.

In some embodiments, the assigning of the operational metric includes determining a distance from the vehicle to an object based on sensor data obtained from one or more sensors of the vehicle.

In some embodiments, the operational metric increases as the distance from the vehicle to the object decreases.

In some embodiments, the one or more processors terminate generation of a trajectory including a motion segment of the multiple motion segments.

In some embodiments, the terminating of the generation of the trajectory is performed responsive to an operational metric assigned to the motion segment being greater than a threshold value.

In some embodiments, the linear temporal logic expression is one of multiple ranked linear temporal logic expressions.

In some embodiments, an operational metric of a first linear temporal logic expression of the multiple ranked linear temporal logic expressions is greater than an operational metric of a second linear temporal logic expression of the multiple ranked linear temporal logic expressions.

In some embodiments, the first linear temporal logic expression is associated with a probability of a collision of the vehicle with an object and the second linear temporal logic expression is associated with a level of passenger comfort measured by one or passenger sensors of the vehicle.

In some embodiments, the value of the linear temporal logic expression is determined to be false responsive to a probability of a collision of the vehicle with the object being greater then a threshold value.

In some embodiments, the linear temporal logic expression includes a propositional variable representing an (x,y) position of the vehicle.

In some embodiments, the (x,y) position of the vehicle is associated with whether the vehicle is located within a lane or an intersection.

In some embodiments, the generating of the Kripke structure includes: for each motion segment, determining a lateral error tolerance of the vehicle with respect to an object when the vehicle is operated in accordance with the motion segment.

In some embodiments, the generating of the Kripke structure further includes associating, using the one or more processors, each edge of the multiple edges with the determined lateral error tolerance.

In some embodiments, the linear temporal logic expression includes a minimum speed of the vehicle to avoid a collision of the vehicle with the object.

In some embodiments, the linear temporal logic expression includes a minimum acceleration of the vehicle to avoid a collision of the vehicle with the object.

In some embodiments, the linear temporal logic expression includes a maximum speed or a maximum acceleration of the vehicle associated with a level of passenger comfort measured by passenger sensors located on the vehicle.

In some embodiments, a control module of the vehicle operates the vehicle in accordance with the selected motion segment while violating the operating constraint to avoid a collision of the vehicle with the object.

In some embodiments, one or more processors of a vehicle store a Kripke structure representing a motion segment for operating the vehicle. The motion segment includes multiple spatiotemporal locations. For each spatiotemporal location of the multiple spatiotemporal locations: the one or more processors evaluate a linear temporal logic expression based on the Kripke structure. The linear temporal logic expression defines an operating constraint for operating the vehicle in accordance with the motion segment. Responsive to a value of the linear temporal logic expression changing at the spatiotemporal location, the one or more processors insert a location marker within the Kripke structure at the spatiotemporal location to divide the motion segment into two different motion segments. The one or more processors assign an operational metric to each motion segment of the two different motion segments based on the location marker. The one or more processors determine a trajectory for operating the vehicle based on the operational metric.

In some embodiments, the operational metric across the trajectory is minimized.

In some embodiments, the linear temporal logic expression includes one or more linear temporal logic propositions.

In some embodiments, a first linear temporal logic proposition of the one or more linear temporal logic propositions corresponds to whether the vehicle is located within an intersection.

In some embodiments, a second linear temporal logic proposition of the one or more linear temporal logic propositions corresponds to a lane in which the vehicle is operating.

In some embodiments, the value of the linear temporal logic expression corresponds to whether the vehicle is changing the lane in which the vehicle is operating while the vehicle is operating within the intersection.

In some embodiments, the value of the linear temporal logic expression corresponds to whether the vehicle is operating in a direction specified by the operating constraint.

In some embodiments, a control module of the vehicle operates the vehicle in accordance with the determined trajectory.

In some embodiments, it is determined whether the operating of the vehicle in accordance with the motion segment violates the operating constraint.

In some embodiments, determining that the operating of the vehicle violates the operating constraint is responsive to the value of the linear temporal logic expression being false.

In some embodiments, the evaluating of the linear temporal logic expression includes determining values of the linear temporal logic expression for a sequence of states of the vehicle based on a temporal modal operator.

In some embodiments, the operating of the vehicle in accordance with the determined trajectory is responsive to the operational metric being less than a threshold value.

In some embodiments, the assigning of the operational metric includes determining a rank of the operating constraint.

In some embodiments, the operating constraint is one of a ranked plurality of operating constraints.

In some embodiments, the Kripke structure is generated. Each vertex of multiple vertices of the Kripke structure corresponds to a respective spatiotemporal location of the multiple spatiotemporal locations.

In some embodiments, an edge of the Kripke structure connecting a first vertex and a second vertex corresponds to the motion segment for operating the vehicle from a first spatiotemporal location to a second spatiotemporal location.

In some embodiments, a first value of the linear temporal logic expression evaluated at the first vertex is different from a second value of the linear temporal logic expression evaluated at the second vertex.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
   storing, using one or more processors of a vehicle, a Kripke structure representing a motion segment for operating the vehicle, wherein the motion segment comprises a plurality of spatiotemporal locations;
   for each spatiotemporal location of the plurality of spatiotemporal locations:
      evaluating, using the one or more processors, a linear temporal logic expression based on the Kripke structure, wherein the linear temporal logic expression defines an operating constraint for operating the vehicle in accordance with the motion segment;
   responsive to a value of the linear temporal logic expression changing at the spatiotemporal location, inserting, using the one or more processors, a location marker within the Kripke structure at the spatiotemporal location to divide the motion segment into two different motion segments;
   assigning, using the one or more processors, an operational metric to each motion segment of the two different motion segments based on the location marker;
   determining, using the one or more processors, a trajectory for operating the vehicle based on the operational metric; and
   causing, using a control module of the vehicle, the vehicle to operate in accordance with the determined trajectory.

2. The method of claim 1, wherein the operational metric across the trajectory is minimized.

3. The method of claim 1, wherein the linear temporal logic expression comprises one or more linear temporal logic propositions.

4. The method of claim 3, wherein a first linear temporal logic proposition of the one or more linear temporal logic propositions corresponds to whether the vehicle is located within an intersection.

5. The method of claim 4, wherein a second linear temporal logic proposition of the one or more linear temporal logic propositions corresponds to a lane in which the vehicle is operating.

6. The method of claim 5, wherein the value of the linear temporal logic expression corresponds to whether the vehicle is changing the lane in which the vehicle is operating while the vehicle is operating within the intersection.

7. The method of claim 1, wherein the value of the linear temporal logic expression corresponds to whether the vehicle is operating in a direction specified by the operating constraint.

8. The method of claim 1, further comprising:
   determining whether operating of the vehicle in accordance with the motion segment violates the operating constraint.

9. The method of claim 8, wherein determining whether the operating of the vehicle in accordance with the motion segment violates the operating constraint comprises:
   determining that the value of the linear temporal logic expression is false, and
   responsive to determining that the value of the linear temporal logic expression is false, determining that the operating of the vehicle violates the operating constraint.

10. The method of claim 1, wherein evaluating the linear temporal logic expression comprises determining values of the linear temporal logic expression for a sequence of states of the vehicle based on a temporal modal operator.

11. The method of claim 1, further comprising:
    determining that the operational metric is less than a threshold value,
    responsive to determining that the operational metric is less than then threshold value, causing the vehicle to operate in accordance with the determine trajectory.

12. The method of claim 1, wherein assigning of the operational metric comprises determining a rank of the operating constraint.

13. The method of claim 12, wherein the operating constraint is one of a ranked plurality of operating constraints.

14. The method of claim 1, further comprising generating the Kripke structure, wherein each vertex of a plurality of vertices of the Kripke structure corresponds to a respective spatiotemporal location of the plurality of spatiotemporal locations.

15. The method of claim 14, wherein an edge of the Kripke structure connecting a first vertex and a second vertex corresponds to the motion segment for operating the vehicle from a first spatiotemporal location to a second spatiotemporal location.

16. The method of claim 15, wherein a first value of the linear temporal logic expression evaluated at the first vertex is different from a second value of the linear temporal logic expression evaluated at the second vertex.

17. A vehicle comprising:
    one or more computer processors; and
    one or more non-transitory storage media storing instructions which, when executed by the one or more computer processors, cause the one or more computer processors to perform operations comprising:

storing a Kripke structure representing a motion segment for operating a vehicle, wherein the motion segment comprises a plurality of spatiotemporal locations;
for each spatiotemporal location of the plurality of spatiotemporal locations:
  evaluating a linear temporal logic expression based on the Kripke structure, wherein the linear temporal logic expression defines an operating constraint for operating the vehicle in accordance with the motion segment;
responsive to a value of the linear temporal logic expression changing at the spatiotemporal location, inserting a location marker within the Kripke structure at the spatiotemporal location to divide the motion segment into two different motion segments;
assigning an operational metric to each motion segment of the two different motion segments based on the location marker;
determining a trajectory for operating the vehicle based on the operational metric; and
causing the vehicle to operate in accordance with the determined trajectory.

18. One or more non-transitory storage media storing instructions which, when executed by one or more computing devices, cause the one or more computing devices to perform operations comprising:
storing a Kripke structure representing a motion segment for operating a vehicle, wherein the motion segment comprises a plurality of spatiotemporal locations;
for each spatiotemporal location of the plurality of spatiotemporal locations:
  evaluating a linear temporal logic expression based on the Kripke structure, wherein the linear temporal logic expression defines an operating constraint for operating the vehicle in accordance with the motion segment;
responsive to a value of the linear temporal logic expression changing at the spatiotemporal location, inserting a location marker within the Kripke structure at the spatiotemporal location to divide the motion segment into two different motion segments;
assigning an operational metric to each motion segment of the two different motion segments based on the location marker;
determining a trajectory for operating the vehicle based on the operational metric; and
causing the vehicle to operate in accordance with the determined trajectory.

\* \* \* \* \*